US009963856B2

(12) United States Patent
Takahashi et al.

(10) Patent No.: US 9,963,856 B2
(45) Date of Patent: May 8, 2018

(54) HYDRAULIC DRIVE SYSTEM FOR CONSTRUCTION MACHINE

(71) Applicant: Hitachi Construction Machinery Tierra Co., Ltd., Koko-shi, Shiga (JP)

(72) Inventors: Kiwamu Takahashi, Moriyama (JP); Kazushige Mori, Moriyama (JP); Yoshifumi Takebayashi, Kouka (JP); Natsuki Nakamura, Kouka (JP)

(73) Assignee: Hitachi Construction Machinery Tierra Co., Ltd., Koka-shi (JP)

( * ) Notice: Subject to any disclaimer, the term of this patent is extended or adjusted under 35 U.S.C. 154(b) by 0 days. days.

(21) Appl. No.: 15/038,179

(22) PCT Filed: Dec. 2, 2014

(86) PCT No.: PCT/JP2014/081912

§ 371 (c)(1),
(2) Date: May 20, 2016

(87) PCT Pub. No.: WO2015/141073

PCT Pub. Date: Sep. 24, 2015

(65) Prior Publication Data

US 2017/0037601 A1 Feb. 9, 2017

(30) Foreign Application Priority Data

Mar. 17, 2014 (JP) ................................ 2014-054196

(51) Int. Cl.
*F16D 31/02* (2006.01)
*E02F 9/22* (2006.01)
(Continued)

(52) U.S. Cl.
CPC ............ *E02F 9/2271* (2013.01); *E02F 3/425* (2013.01); *E02F 9/2235* (2013.01);
(Continued)

(58) Field of Classification Search
CPC ....... F15B 11/163; F15B 11/165; F15B 11/17; E02F 9/2239; E02F 9/2282; E02F 9/2292; E02F 9/2296
See application file for complete search history.

(56) References Cited

U.S. PATENT DOCUMENTS

| | | | | |
|---|---|---|---|---|
| 6,408,622 B1 * | 6/2002 | Tsuruga | ................ | E02F 9/2207 60/422 |
| 7,251,934 B2 * | 8/2007 | Lech | ..................... | E02F 9/2225 60/430 |
| 7,350,353 B2 * | 4/2008 | Ioku | ...................... | E02F 9/2239 60/421 |

FOREIGN PATENT DOCUMENTS

| | | |
|---|---|---|
| EP | 0913586 A1 | 5/1999 |
| JP | 7-317708 A | 12/1995 |

(Continued)

OTHER PUBLICATIONS

International Preliminary Report on Patentability (PCT/IB/338 & PCT/IB/373) including English translation of Written Opinion (PCT/ISA/237) issued in PCT Application No. PCT/JP2014/081912 dated Sep. 29, 2016 (five pages).

*Primary Examiner* — Michael Leslie
(74) *Attorney, Agent, or Firm* — Crowell & Moring LLP

(57) ABSTRACT

An object to achieve favorable operability, in a combined operation that involves a specific actuator and involves a great difference in load pressure and when an operation of an operating unit for the specific actuator is a fine operation, by reducing energy consumption arising from wasted restricting pressure loss of a pressure compensating valve and by flexibly varying a flow rate of a hydraulic fluid supplied to the specific actuator depending on the load pressure. To achieve this object, a boom cylinder (3*a*) is provided with an open center type flow control valve (6*a*) that controls a hydraulic fluid from a main pump (202) and a closed center (Continued)

type flow control valve (6*i*) that controls a hydraulic fluid from a main pump (102). The main pump (102) is subject to load sensing control. The flow control valve (6*a*) is opened to control a supply flow rate up to an intermediate zone of an operating range of an operating unit for the boom cylinder (3*a*). Both the flow control valves (6*a*) and (6*i*) are opened to control the supply flow rate after the intermediate zone.

6 Claims, 10 Drawing Sheets

(51) Int. Cl.

| | |
|---|---|
| ***F15B 11/16*** | (2006.01) |
| ***F15B 11/17*** | (2006.01) |
| ***E02F 3/42*** | (2006.01) |
| ***F15B 13/06*** | (2006.01) |
| *E02F 3/32* | (2006.01) |
| *E02F 3/96* | (2006.01) |

(52) U.S. Cl.
CPC .......... *E02F 9/2239* (2013.01); *E02F 9/2267* (2013.01); *E02F 9/2282* (2013.01); *E02F 9/2285* (2013.01); *E02F 9/2292* (2013.01); *E02F 9/2296* (2013.01); *F15B 11/163* (2013.01); *F15B 11/165* (2013.01); *F15B 11/17* (2013.01); *F15B 13/06* (2013.01); *E02F 3/325* (2013.01); *E02F 3/964* (2013.01); *F15B 2211/20546* (2013.01); *F15B 2211/20576* (2013.01); *F15B 2211/255* (2013.01); *F15B 2211/30565* (2013.01); *F15B 2211/3111* (2013.01); *F15B 2211/3116* (2013.01)

(56) References Cited

FOREIGN PATENT DOCUMENTS

| | | |
|---|---|---|
| JP | 10-037907 A | 2/1998 |
| JP | 2009-014122 A | 1/2009 |

* cited by examiner

OPEN CENTER TYPE FLOW CONTROL VALVE (FOR MAIN DRIVE)

CLOSED CENTER TYPE FLOW CONTROL VALVE (FOR ASSIST DRIVE)

HYDRAULIC DRIVE SYSTEM FOR CONSTRUCTION MACHINE

TECHNICAL FIELD

The present invention relates generally to hydraulic drive systems for construction machines such as hydraulic excavators and, more particularly, to a hydraulic drive system that performs load sensing control for controlling a delivery flow rate of a hydraulic pump such that a delivery pressure of the hydraulic pump is higher by a target differential pressure than a maximum load pressure of a plurality of actuators.

BACKGROUND ART

A known hydraulic drive system for a construction machine such as a hydraulic excavator controls a delivery flow rate of a hydraulic pump (one pump) such that a delivery pressure of the hydraulic pump is higher by a target differential pressure than a maximum load pressure of a plurality of actuators. This control is called load sensing control. The hydraulic drive system that performs the load sensing control includes a plurality of pressure compensating valves, each of the pressure compensating valves maintaining, as disclosed in Patent Document 1, a predetermined differential pressure across each of respective flow control valves. The hydraulic drive system is thereby be able, in a combined operation in which the actuators are driven simultaneously, to supply each of the actuators with a hydraulic fluid at a ratio corresponding to an opening area of each flow control valve regardless of the magnitude of a load pressure on each of the actuators.

PRIOR ART DOCUMENT

Patent Document

Patent Document 1: JP-2009-14122-A

SUMMARY OF THE INVENTION

Problem to be Solved by the Invention

In the hydraulic drive system disclosed in Patent Document 1, the delivery pressure of the hydraulic pump is controlled so as to be higher by the target differential pressure than the maximum load pressure of the actuators whenever a combined operation in which the actuators are driven simultaneously is performed. Thus, in a combined operation of, for example, a horizontally leveling operation that involves a large load pressure difference and includes, for example, a boom raising fine operation (high load pressure) and an arm crowding operation (low load pressure) performed simultaneously, the delivery pressure of the hydraulic pump is controlled to be higher by a certain set pressure than the high load pressure on a boom cylinder. Further, the delivery pressure of the hydraulic pump restricts the pressure compensating valve for an actuator having a lower load pressure (an arm cylinder in the horizontally leveling operation) in order to prevent an excessive amount of hydraulic fluid from flowing to the actuator having the lower load pressure, thus consuming power drive (energy) due to this wasted restricting pressure loss.

Additionally, the hydraulic excavator may perform an operation called sweeping work in which the hydraulic excavator moves a bucket along the ground with a bucket claw end in contact with the ground and collects crushed waste including stone chips, concrete chips, and wooden chips, to thereby clean the ground. This sweeping work is performed through the combined operation of the boom raising fine operation (high load pressure) and the arm crowding operation (low load pressure), as in the horizontally leveling operation. It is, however, noted that, because the shape of the ground needs to be maintained in the sweeping work, the bucket claw end is required to be flexibly adjusted in a vertical position thereof so as to follow along bumps and dents, if any, on the ground.

To flexibly adjust the vertical position of the bucket claw end so as to follow along the ground, preferably, an extending/contracting speed of the boom cylinder changes flexibly corresponding to the load pressure on the boom cylinder when the load pressure on the boom cylinder varies with the magnitude of force with which the bucket claw end contacts bumps and dents on the ground.

In the hydraulic drive system disclosed in Patent Document 1, however, even when the boom operation is a fine operation, the load sensing control controls the delivery flow rate of the hydraulic pump that supplies the actuator (boom cylinder) with the hydraulic fluid and the pressure compensating valve maintains a predetermined differential pressure across the flow control valve. As a result, the flow rate of the hydraulic fluid supplied to the boom cylinder is less affected by the load pressure on the boom cylinder and depends only on an input of a lever in an operating unit. Thus, unfortunately, the hydraulic drive system disclosed in Patent Document 1 finds it difficult, when the ground has surface irregularities, to move the bucket claw end to follow along the bumps and dents on the ground, while keeping the bucket claw end in contact with the ground.

An object of the present invention is to provide a hydraulic drive system for a construction machine, capable of achieving favorable operability, in a combined operation that involves a specific actuator and involves a great difference in load pressure and when an operation of an operating unit for the specific actuator is a fine operation, by reducing energy consumption arising from wasted restricting pressure loss of a pressure compensating valve and by flexibly varying the flow rate of a hydraulic fluid supplied to the specific actuator depending on the load pressure.

Means for Solving the Problem (1) To achieve the foregoing object, an aspect of the present invention provides a hydraulic drive system for a construction machine. The hydraulic drive system includes: a variable displacement first pump device; a second pump device; a plurality of first actuators that are driven by hydraulic fluids delivered from the first pump device; a plurality of second actuators that are driven by hydraulic fluids delivered from the second pump device; a plurality of closed center type flow control valves that control flows of hydraulic fluids supplied from the first pump device to the first actuators; a plurality of open center type flow control valves that control flows of hydraulic fluids supplied from the second pump device to the second actuators; a plurality of pressure compensating valves that control differential pressures across the respective closed center type flow control valves; and a first pump control unit including a load sensing control section that controls capacity of the first pump device such that a delivery pressure of the first pump device is higher by a target differential pressure than a maximum load pressure of the first hydraulic actuators. The first and second actuators include at least one first specific actuator as a common actuator. The first actuators include a second specific actuator that is used at relatively high frequency in a combined operation with the first specific actuator. The open center type flow control valves include a first flow control valve that controls a flow of a hydraulic fluid supplied from the second pump device to the first specific actuator. The closed center type flow control valves include a second flow control valve that controls a flow of a hydraulic fluid supplied from the first pump device to the first specific actuator. The first and second flow control valves are set to have an opening area characteristic such that, when an operating unit for the first specific actuator is operated up to an intermediate zone of an operating range, only the first flow control valve opens to supply a hydraulic fluid from the second pump device to the first specific actuator and, when the operating unit is operated further from the intermediate zone, both the first and second flow control valves open to join and supply hydraulic fluids from the first and second pump devices to the first specific actuator.

In the aspect of the present invention, even in a combined operation (for example, a horizontally leveling operation and sweeping work) that involves the first specific actuator (that corresponds the "specific actuators" in the object of the present invention, for example, a boom cylinder) and the second specific actuator (for example, an arm cylinder) and involves a great difference in load pressure between the first specific actuator and the second specific actuator, the first and second specific actuators are driven by hydraulic fluids from the respective pump devices (the first specific actuator is driven by the hydraulic fluid delivered from the second pump device and the second specific actuator is driven by the hydraulic fluid delivered from the first pump device). Thus, restricting pressure loss in the pressure compensating valve does not occur, so that energy consumption arising from the wasted restricting pressure loss of the pressure compensating valve can be prevented.

The first flow control valve that controls the flow of the hydraulic fluid supplied to the first specific actuator from the second pump device is an open center type. Thus, use of the first specific actuator as a boom cylinder allows the flow rate of the hydraulic fluid supplied to the boom cylinder to be flexibly varied according to the load pressure on the boom cylinder when the operating unit for the boom cylinder involves a small operation amount, as in sweeping work, so that favorable operability can be obtained.

From the foregoing, in a combined operation that involves a specific actuator and involves a great difference in load pressure and when the operation of the operating unit for the specific actuator is a fine operation, favorable operability can be achieved by reducing energy consumption arising from the wasted restricting pressure loss of the pressure compensating valve and by flexibly varying the flow rate of the hydraulic fluid supplied to the specific actuator depending on the load pressure.

(2) In (1) above, preferably, the first flow control valve is set to have the opening area characteristic such that an opening area increases with increase in the spool stroke and reaches a maximum before a maximum spool stroke is reached, and the second flow control valve is set to have the opening area characteristic such that an opening area remains zero before a spool stroke reaches an intermediate stroke, opens at the intermediate stroke, and then increases with increase in the spool stroke and reaches a maximum opening area immediately before a maximum spool stroke is reached.

Thus, when the operating unit for the first specific actuator is operated up to the intermediate zone of the operating range, only the first flow control valve opens to supply the hydraulic fluid from the second pump device to the first specific actuator. When the operating unit is operated further from the intermediate zone, both the first and second flow control valves open to join and supply the hydraulic fluids from the first and second pump devices-to the first specific actuator.

(3) In (1) above, preferably, the hydraulic drive system further includes a second pump control unit that controls capacity of the second pump device. The first pump device includes the load sensing control section and a first torque control section. The first torque control section receives the delivery pressure of the first pump device introduced thereto and controls to limit the capacity of the first hydraulic pump such that, when at least one of the delivery pressure and the capacity of the first hydraulic pump increases and absorption torque of the first pump device increases, the absorption torque of the first hydraulic pump does not exceed a first predetermined value. The second pump control unit includes a second torque control section that receives a delivery pressure of the second pump device introduced thereto and controls to limit the capacity of the second hydraulic pump such that, when the delivery pressure of the second hydraulic pump increases and absorption torque of the second pump device increases, the capacity of the second pump device is maintained at a maximum when the absorption torque of the second hydraulic pump is equal to or smaller than a second predetermined value and the absorption torque of the second hydraulic pump does not exceed the second predetermined value when the absorption torque of the second hydraulic pump increases up to the second predetermined value. The first pump control unit further includes: a reducing valve that receives the delivery pressure of the second pump device introduced thereto and, when the delivery pressure of the second pump device is equal to or lower than a capacity limiting control starting pressure of the second torque control section, outputs the delivery pressure of the second pump device without reduction and, when the delivery pressure of the second pump device increases beyond the capacity limiting control starting pressure of the second torque control section, reduces the delivery pressure of the second pump device to the capacity limiting control starting pressure of the second torque control section and outputs the reduced delivery pressure of the second pump device; and a reducing torque control actuator that receives the output pressure of the reducing valve and reduces the capacity of the first pump device such that the first predetermined value decreases as the output pressure of the reducing valve increases.

Through the foregoing, total torque control can be accurately performed not only when the absorption torque of the second pump device increases to the second predetermined value and operation is performed with the absorption torque limited to the second predetermined value by the control of the second torque control section, but also when the absorption torque of the second hydraulic pump is equal to or smaller than the second predetermined value and is free from limitation up to the second predetermined value, so that rated output torque of a prime mover can be effectively used.

(4) In any of (1) to (3) above, preferably, the first specific actuator is a boom cylinder that drives a boom of a hydraulic excavator and the second specific actuator is an arm cylinder that drives an arm of the hydraulic excavator.

Through the foregoing, in a horizontally leveling operation in which a boom raising fine operation (high load pressure) and an arm crowding operation (low load pressure) are performed simultaneously, wasteful energy consumption due to restricting pressure loss of the pressure compensating valve on the arm cylinder side on the low load side is reduced. In sweeping work through the boom raising fine operation (high load pressure) and the arm crowding operation (low load pressure), the flow rate of the hydraulic fluid supplied to the boom cylinder is flexibly varied by the load pressure, so that favorable operability can be achieved.

Effect of the Invention

The present invention can achieve favorable operability by reducing energy consumption arising from the wasted restricting pressure loss of the pressure compensating valve and by flexibly varying the flow rate of the hydraulic fluid supplied to a specific actuator (first specific actuator) depending on the load pressure in a combined operation that involves the specific actuator and involves a great difference in load pressure and when the operation of an operating unit for the specific actuator is a fine operation.

MODES FOR CARRYING OUT THE INVENTION

Embodiments of the present invention will be described below with reference to the accompanying drawings.

First Embodiment

—Structure—

Figure 1:
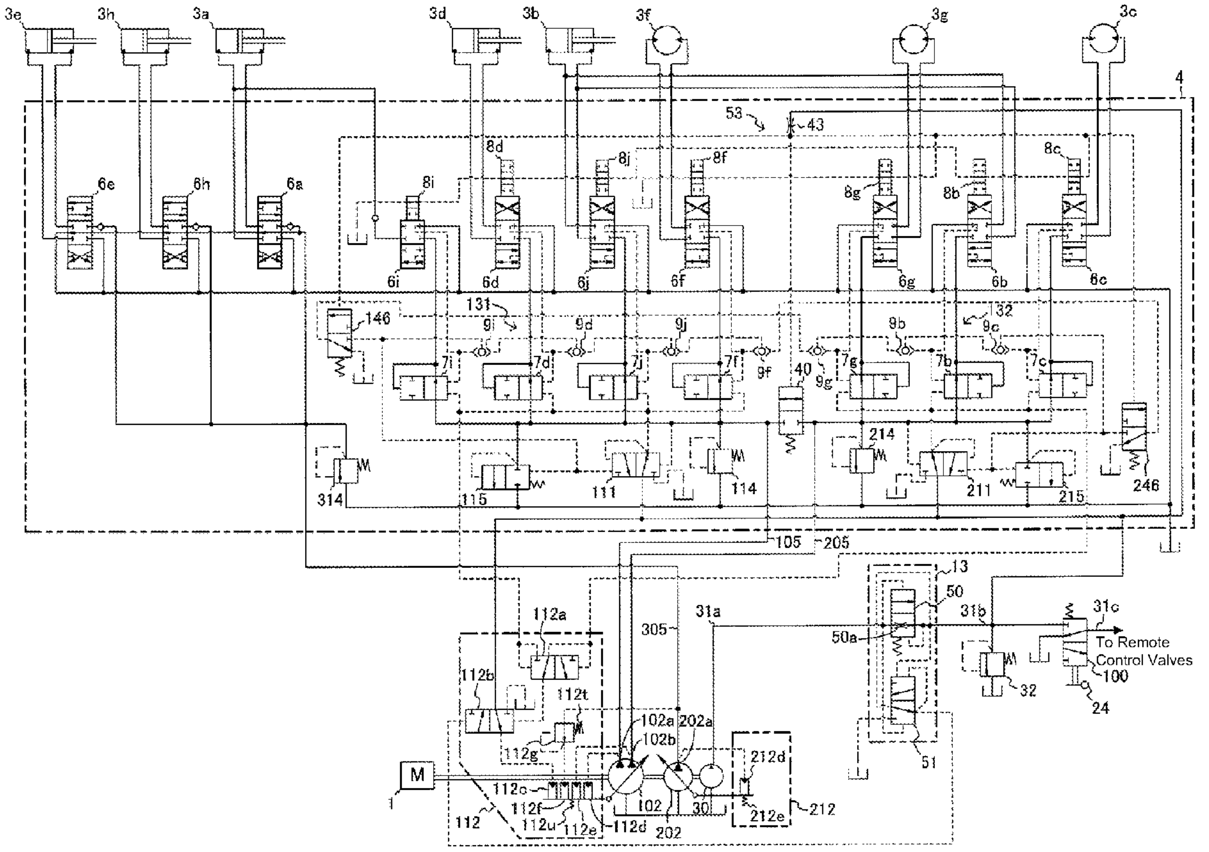
FIG. 1 is a diagram illustrating a hydraulic drive system for a hydraulic excavator (construction machine) according to a first embodiment of the present invention.

FIG. 1 is a diagram illustrating a hydraulic drive system for a hydraulic excavator (construction machine) according to a first embodiment of the present invention.

In FIG. 1, the hydraulic drive system in the present embodiment includes a prime mover (e.g., diesel engine) 1, a split-flow-type variable displacement main pump 102 (first pump device), a single-flow-type variable displacement main pump 202 (second pump device), a plurality of actuators 3*a*, 3*b*, 3*c*, 3*d*, 3*e*, 3*f*, 3*g*, and 3*h*, a control valve unit 4, a regulator 112 (first pump control unit), and a regulator 212 (second pump control unit). More specifically, the main pump 102 is driven by the prime mover 1 and has first and second delivery ports 102*a* 102*b* through which a hydraulic fluid is delivered to first and second hydraulic fluid supply lines 105 and 205. The main pump 202 is driven by the prime mover 1 and has a third delivery port 202*a* through which a hydraulic fluid is delivered to a third hydraulic fluid supply line 305. The actuators 3*a*, 3*b*, 3*c*, 3*d*, 3*e*, 3*f*, 3*g*, and 3*h* are driven by the hydraulic fluid delivered from the first and second delivery ports 102*a* and 102*b* of the main pump 102 and from the third delivery port 202*a* of the main pump 202. The control valve unit 4 is connected to the first to third hydraulic fluid supply lines 105, 205, and 305 and controls a flow of the hydraulic fluid supplied from the first and second delivery ports 102*a* and 102*b* of the main pump 102 and the third delivery port 202*a* of the main pump 202 to the actuators 3*a* to 3*h*. The regulator 112 controls delivery flow rates of the first and second delivery ports 102*a* and 102*b* of the main pump 102. The regulator 212 controls a delivery flow rate of the third delivery port 202*a* of the main pump 202.

Of the actuators 3*a*, 3*b*, 3*c*, 3*d*, 3*e*, 3*f*, 3*g*, and 3*h*, the actuators 3*a*, 3*b*, 3*c*, 3*d*, 3*f*, and 3*g* are each a first actuator driven by the hydraulic fluid delivered from the first and second delivery ports 102*a* and 102*b* of the main pump 102. Of the actuators 3*a*, 3*b*, 3*c*, 3*d*, 3*e*, 3*f*, 3*g*, and 3*h*, the actuators 3*a*, 3*e*, and 3*h* are each a second actuator driven by the hydraulic fluid delivered from the third delivery port 202*a* of the main pump 202. The actuator 3*a* is a common actuator that constitutes both the first and second actuators.

The control valve unit 4 includes a plurality of closed center type flow control valves 6*b*, 6*c*, 6*d*, 6*f*, 6*g*, 6*i*, and 6*j*, a plurality of pressure compensating valves 7*b*, 7*c*, 7*d*, 7*f*, 7*g*, 7*i*, and 7*j*, a plurality of operation detecting valves 8*b*, 8*c*, 8*d*, 8*f*, 8*g*, 8*i*, and 8*j*, a plurality of open center type flow control valves 6*a*, 6*e*, and 6*h*, a main relief valve 114, a main relief valve 214, a main relief valve 314, an unloading valve 115, and an unloading valve 215. More specifically, the flow control valves 6*b*, 6*c*, 6*d*, 6*f*, 6*g*, 6*i*, and 6*j* are connected to the first and second hydraulic fluid supply lines 105 and 205 and control flow rates of hydraulic fluids supplied from the first and second delivery ports 102*a* and 102*b* of the main pump 102 to the first actuators 3*a*, 3*b*, 3*c*, 3*d*, 3*f*, and 3*g*. The pressure compensating valves 7*b*, 7*c*, 7*d*, 7*f*, 7*g*, 7*i*, and 7*j* control differential pressures across the respective flow control valves 6*b*, 6*c*, 6*d*, 6*f*, 6*g*, 6*i*, and 6*j* such that the differential pressures across the respective flow control valves 6*b*, 6*c*, 6*d*, 6*f*, 6*g*, 6*i*, and 6*j* are equal to a target differential pressure. The operation detecting valves 8$b$, 8$c$, 8$d$, 8$f$, 8$g$, 8$i$, and 8$j$ perform a stroke movement with spools of the respective flow control valves 6$b$, 6$c$, 6$d$, 6$f$, 6$g$, 6$i$, and 6$j$ to thereby detect changeover of the respective flow control valves. The flow control valves 6$a$, 6$e$, and 6$h$ are connected to the third hydraulic fluid supply line 305 and control flow rates of hydraulic fluids supplied from the third delivery port 202$a$ of the main pump 202 to the second actuators 3$a$, 3$e$, and 3$h$. The main relief valve 114 is connected to the first hydraulic fluid supply line 105 and controls to keep the pressure in the first hydraulic fluid supply line 105 below a set pressure. The main relief valve 214 is connected to the second hydraulic fluid supply line 205 and controls to keep the pressure in the second hydraulic fluid supply line 205 below a set pressure. The main relief valve 314 is connected to the third hydraulic fluid supply line 305 and controls to keep the pressure in the third hydraulic fluid supply line 305 below a set pressure. The unloading valve 115 is connected to the first hydraulic fluid supply line 105 and opens to return the hydraulic fluid in the first hydraulic fluid supply line 105 back to a tank when the pressure in the first hydraulic fluid supply line 105 is higher than (an unloading valve set pressure that is) a maximum load pressure of the actuator driven by the hydraulic fluid delivered from the first delivery port 102$a$, to which a spring set pressure (predetermined pressure) is added. The unloading valve 215 is connected to the second hydraulic fluid supply line 205 and opens to return the hydraulic fluid in the second hydraulic fluid supply line 205 back to a tank when the pressure in the second hydraulic fluid supply line 205 is higher than (an unloading valve set pressure that is) a maximum load pressure of the actuator driven by the hydraulic fluid delivered from the second delivery port 102$b$, to which a spring set pressure (predetermined pressure) is added.

Further, the control valve unit 4 includes a first load pressure detecting circuit 131, a second load pressure detecting circuit 132, a differential pressure reducing valve 111, and a differential pressure reducing valve 211. More specifically, the first load pressure detecting circuit 131 includes shuttle valves 9$d$, 9$f$, 9$i$, and 9$j$ that are connected to load ports of the flow control valves 6$d$, 6$f$, 6$i$, and 6$j$ connected to the first hydraulic fluid supply line 105 and detect a maximum load pressure Plmax1 of the actuators 3$a$, 3$b$, 3$d$, and 3$f$. The second load pressure detecting circuit 132 includes shuttle valves 9$b$, 9$c$, and 9$g$ that are connected to load ports of the flow control valves 6$b$, 6$c$, and 6$g$ connected to the second hydraulic fluid supply line 205 and detect a maximum load pressure Plmax2 of the actuators 3$b$, 3$c$, and 3$g$. The differential pressure reducing valve 111 outputs, as an absolute pressure Pls1, a difference (LS differential pressure) between a pressure in the first hydraulic fluid supply line 105 (specifically, pressure at the first delivery port 102$a$) P1 and the maximum load pressure Plmax1 detected by the first load pressure detecting circuit 131 (maximum load pressure of the actuators 3$a$, 3$b$, 3$d$, and 3$f$ connected to the first hydraulic fluid supply line 105). The differential pressure reducing valve 211 outputs, as an absolute pressure Pls2, a difference (LS differential pressure) between a pressure in the second hydraulic fluid supply line 205 (specifically, pressure at the second delivery port 102$b$) P2 and the maximum load pressure Plmax2 detected by the second load pressure detecting circuit 132 (maximum load pressure of the actuators 3$b$, 3$c$, and 3$g$ connected to the second hydraulic fluid supply line 205). In the following, the absolute pressures Pls1 and Pls2 output by the differential pressure reducing valves 111 and 211 will be referred to as LS differential pressures Pls1 and Pls2 as appropriate.

The maximum load pressure Plmax1 detected by the first load pressure detecting circuit 131 as the maximum load pressure of the actuators driven by the hydraulic fluid delivered from the first delivery port 102$a$ is introduced to the unloading valve 115. The maximum load pressure Plmax2 detected by the second load pressure detecting circuit 132 as the maximum load pressure of the actuators driven by the hydraulic fluid delivered from the second delivery port 102$b$ is introduced to the unloading valve 215.

The LS differential pressure Pls1 output by the differential pressure reducing valve 111 is introduced to the pressure compensating valves 7$d$, 7$f$, 7$i$, and 7$j$ that are connected to the first hydraulic fluid supply line 105 and the regulator 112 of the main pump 102. The LS differential pressure Pls2 output by the differential pressure reducing valve 211 is introduced to the pressure compensating valves 7$b$, 7$c$, and 7$g$ that are connected to the second hydraulic fluid supply line 205 and the regulator 112 of the main pump 102.

It is here noted that the actuator 3$a$ is connected to the first delivery port 102$a$ via the flow control valve 6$i$, the pressure compensating valve 7$i$, and the first hydraulic fluid supply line 105, and is further connected to the third delivery port 202$a$ via the flow control valve 6$a$ and the third hydraulic fluid supply line 305. The actuator 3$a$ is, for example, a boom cylinder (first specific actuator) that drives a boom of the hydraulic excavator. The flow control valve 6$a$ serves, for example, as a main drive (first flow control valve) for the boom cylinder 3$a$. The flow control valve 6$i$ serves, for example, as an assist drive (second flow control valve) for the boom cylinder 3$a$. The actuator 3$b$ is connected to the first delivery port 102$a$ via the flow control valve 6$j$, the pressure compensating valve 7$j$, and the first hydraulic fluid supply line 105, and is further connected to the second delivery port 102$b$ via the flow control valve 6$b$, the pressure compensating valve 7$b$, and the second hydraulic fluid supply line 205. The actuator 3$b$ is, for example, an arm cylinder (second specific actuator) that drives an arm of the hydraulic excavator. The flow control valve 6$b$ serves, for example, as a main drive for the arm cylinder 3$b$. The flow control valve 6$j$ serves, for example, as an assist drive for the arm cylinder 3$b$.

The actuators 3$d$ and 3$f$ are connected to the first delivery port 102$a$ via the flow control valves 6$d$ and 6$f$ and the pressure compensating valves 7$d$ and 7$f$, respectively, and the first hydraulic fluid supply line 105. The actuators 3$c$ and 3$g$ are connected to the second delivery port 102$b$ via the flow control valves 6$c$ and 6$g$ and the pressure compensating valves 7$c$ and 7$g$, respectively, and the second hydraulic fluid supply line 205. The actuators 3$d$ and 3$f$ are, for example, a bucket cylinder that drives a bucket of the hydraulic excavator and a left track motor that drives a left crawler of a lower track structure of the hydraulic excavator, respectively. The actuators 3$c$ and 3$g$ are, for example, a swing motor that drives an upper swing structure of the hydraulic excavator and a right track motor that drives a right crawler of the lower track structure of the hydraulic excavator, respectively. The actuators 3$e$ and 3$h$ are connected to the third delivery port 202$a$ via the flow control valves 6$e$ and 6$h$, respectively, and the third hydraulic fluid supply line 305. The actuators 3$e$ and 3$h$ are, for example, a swing cylinder that drives a swing post of the hydraulic excavator and a blade cylinder that drives a blade of the hydraulic excavator, respectively.

The boom cylinder 3$a$ and the arm cylinder 3$b$ require a maximum demanded flow rate that is greater than maximum demanded flow rates of other actuators. Additionally, the arm cylinder 3*b* (second specific actuator) is used at relatively high frequency in a combined operation with the boom cylinder 3*a* (first actuator).

Figure 2A:
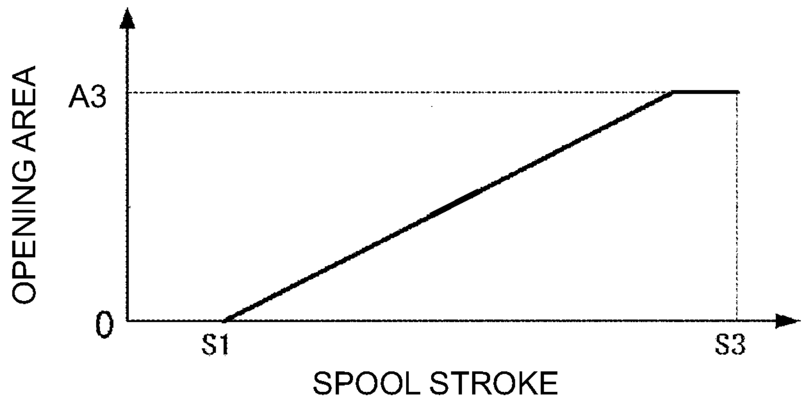
FIG. 2A is a graph illustrating an opening area characteristic of a meter-in passage of each of flow control valves of actuators other than a boom cylinder and an arm cylinder.

FIG. 2A is a graph illustrating an opening area characteristic of a meter-in passage of each of the flow control valves 6*c* to 6*h* (closed center type) of the actuators 3*c* to 3*h* (actuators other than the boom cylinder 3*a* and the arm cylinder 3*b*). These flow control valves are set to have an opening area characteristic in which an opening area of the meter-in passage increases with increase in the spool stroke after a dead zone of 0 to S1 and reaches a maximum opening area A3 immediately before a maximum spool stroke S3 is reached. The maximum opening area A3 varies from one type of actuator to another.

Figure 2B:
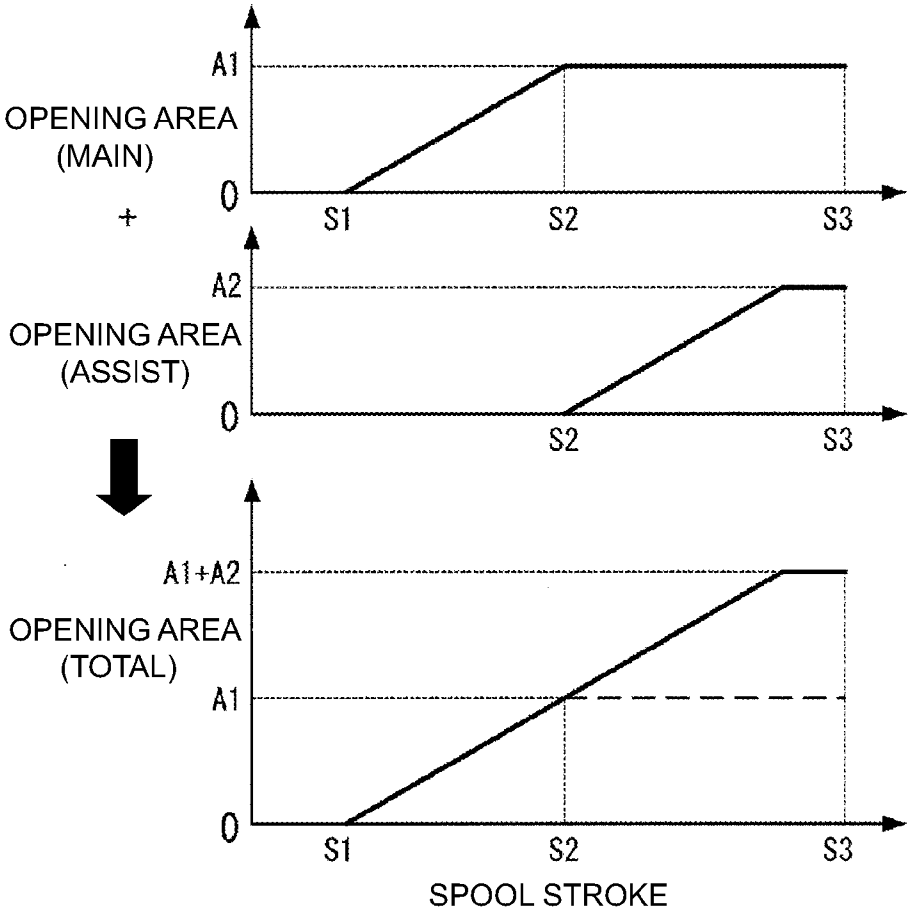
FIG. 2B shows graphs illustrating opening area characteristics of meter-in passages of main and assist flow control valves of the arm cylinder (upper graphs) and a combined opening area characteristic of the meter-in passages of the main and assist flow control valves of the arm cylinder (lower graph).

FIG. 2B shows graphs illustrating the opening area characteristics of the meter-in passages of the flow control valves 6*b* and 6*j* (closed center type) of the arm cylinder 3*b* (second specific actuator). The upper graphs of FIG. 2B illustrate individually the opening area characteristics of the flow control valves 6*b* and 6*j*.

The flow control valve 6*b* for the main drive for the arm cylinder 3*b* is set to have an opening area characteristic in which the opening area of the meter-in passage increases with increase in the spool stroke after the dead zone of 0 to S1 and reaches a maximum opening area A1 at an intermediate stroke S2 and the maximum opening area A1 is thereafter maintained up to the maximum spool stroke S3.

The flow control valve 6*j* for the assist drive for the arm cylinder 3*b* is set to have an opening area characteristic in which the opening area of the meter-in passage remains zero until the spool stroke is the intermediate stroke S2, increases with increase in the spool stroke after the intermediate stroke S2, and reaches a maximum opening area A2 immediately before the maximum spool stroke S3 is reached.

The lower graph of FIG. 2B is a graph illustrating a combined opening area characteristic of the meter-in passages of the flow control valves 6*b* and 6*j* of the arm cylinder 3*b*.

The meter-in passage of each of the flow control valves 6*b* and 6*j* of the arm cylinder 3*b* exhibits the opening area characteristic as described above, so that the combined opening area characteristic is such that the opening area increases with increase in the spool stroke after the dead zone of 0 to S1 and reaches a maximum opening area of A1+A2 immediately before the maximum spool stroke S3 is reached.

It is here noted that the maximum opening area A3 of the flow control valves 6*c*, 6*d*, 6*e*, 6*f*, 6*g*, and 6*h* of the actuators 3*c* to 3*h* shown in FIG. 2A and the maximum opening area of A1+A2 combining the flow control valves 6*b* and 6*j* of the arm cylinder 3*b* exhibit the following relation, specifically, A1+A2>A3.

The pressure compensating valves 7*c* to 7*h* and the pressure compensating valves 7*b* and 7*j* control differential pressures across the flow control valves 6*c* to 6*h* and the flow control valves 6*b* and 6*j* of the arm cylinder 3*b*, respectively. The flow rate through each of the flow control valves 6*c* to 6*h* and, 6*b* and 6*j*, thus increases in proportion to the opening area of a corresponding meter-in passage and the flow control valves 6*c* to 6*h* and, 6*b* and 6*j*, each exhibit a flow rate characteristic similar to the characteristics shown in FIGS. 2A and 2B.

Figure 5A:
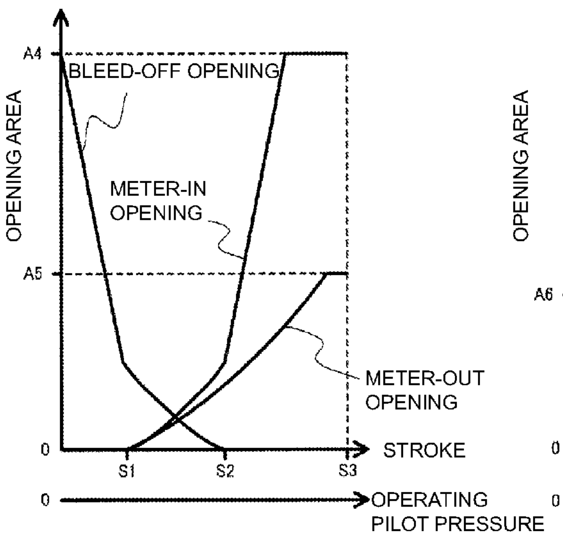
FIG. 5A is a graph illustrating opening area characteristics of a meter-in passage, a meter-out passage, and a bleed-off passage (center bypass passage) of a flow control valve (open center type—first flow control valve) for a main drive for the boom cylinder.

FIG. 5A is a graph illustrating opening area characteristics of a meter-in passage, a meter-out passage, and a bleed-off passage (center bypass passage) of the flow control valve 6*a* (open center type—first flow control valve) for the main drive for the boom cylinder 3*a* (first specific actuator).

The flow control valve 6*a* for the main drive for the boom cylinder 3*a* is set such that the meter-in passage and the meter-out passage have an opening area characteristic in which the opening area increases with increase in the spool stroke after the dead zone of 0 to S1 and reaches a corresponding maximum opening area A4 or A5 before the maximum spool stroke S3 is reached. The opening area characteristic of the meter-in passage is, however, set such that the maximum opening area A4 is greater than the maximum opening area A5 of the opening area characteristic of the meter-out passage and, additionally, when the spool stroke increases beyond the intermediate stroke S2, the opening area increases at a rate higher than a rate at which the opening area increases before the intermediate stroke S2. The flow control valve 6*a* for the main drive for the boom cylinder 3*a* is set such that the bleed-off passage has an opening area characteristic in which the opening area is the maximum opening area A4 when the spool stroke is zero and decreases with increase in the spool stroke from zero and then becomes zero when the intermediate stroke S2 is reached. The opening area characteristic of the bleed-off passage is, however, set such, when the spool stroke increases beyond the dead zone of 0 to S1, the opening area decreases at a rate lower than a rate at which the opening area decreases in the dead zone.

Figure 5B:
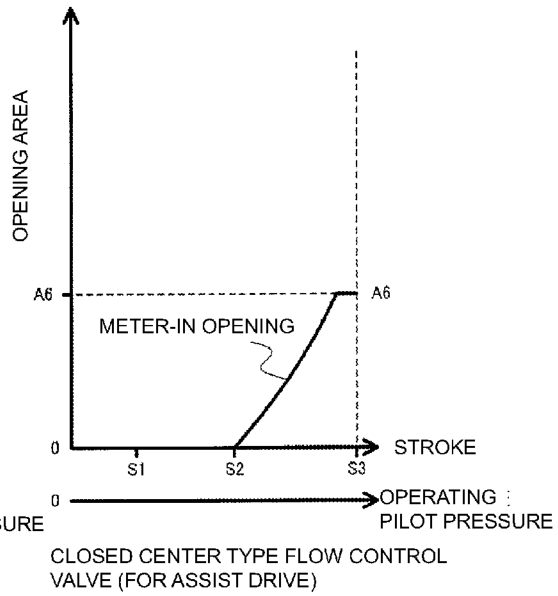
FIG. 5B is a graph illustrating an opening area characteristic of a meter-in passage of a flow control valve (closed center type—second flow control valve) for the assist drive for the boom cylinder.

FIG. 5B is a graph illustrating an opening area characteristic of a meter-in passage of the flow control valve 6*i* (closed center type—second flow control valve) for the assist drive for the boom cylinder 3*a*.

The meter-in passage of the flow control valve 6*i* for the assist drive for the boom cylinder 3*a* is set to have an opening area characteristic in which the opening area remains zero until the spool stroke equals the intermediate stroke S2; the meter-in passage opens at the intermediate stroke S2 and increases its opening area with increase in the spool stroke and then becomes a maximum opening area A6 immediately before the maximum spool stroke S3 is reached.

As illustrated in the lower side of FIGS. 5A and 5B, the spool strokes of the flow control valves 6*a* and 6*i* increase with increase in the operating pilot pressure generated by an operating unit 123 (to be described later—see FIG. 7) for the boom. The intermediate stroke S2 corresponds to the operating pilot pressure generated in an intermediate zone of an operating range of the operating unit 123 for the boom.

As such, the flow control valves 6*a* and 6*i* (first and second flow control valves) are set to offer the following opening area characteristics. Specifically, when the operating unit 123 for the boom is operated up to the intermediate zone of the operating range, only the flow control valve 6*a* (first flow control valve) opens, so that the hydraulic fluid is supplied from the main pump 202 (second pump device) to the boom cylinder 3*a* (first specific actuator). When the operating unit 123 is operated further from the intermediate zone, both of the flow control valves 6*a* and 6*i* (first and second flow control valves) open, so that the hydraulic fluid from the main pumps 102 and 202 (first and second pump devices) are joined and supplied to the boom cylinder 3*a* (first specific actuator).

FIGS. 5A and 5B show that both the spool stroke at which the bleed-off passage of the flow control valve 6*a* closes and the spool stroke at which the meter-in passage of the flow control valve 6*i* opens are the intermediate stroke S2. The intermediate strokes may nonetheless be different from each other when the difference involved is small. For example, the meter-in passage of the flow control valve 6*i* may open immediately before the bleed-off passage of the flow control valve 6*a* closes. This arrangement enables a smooth increase in the flow rate.

Figure 5C:
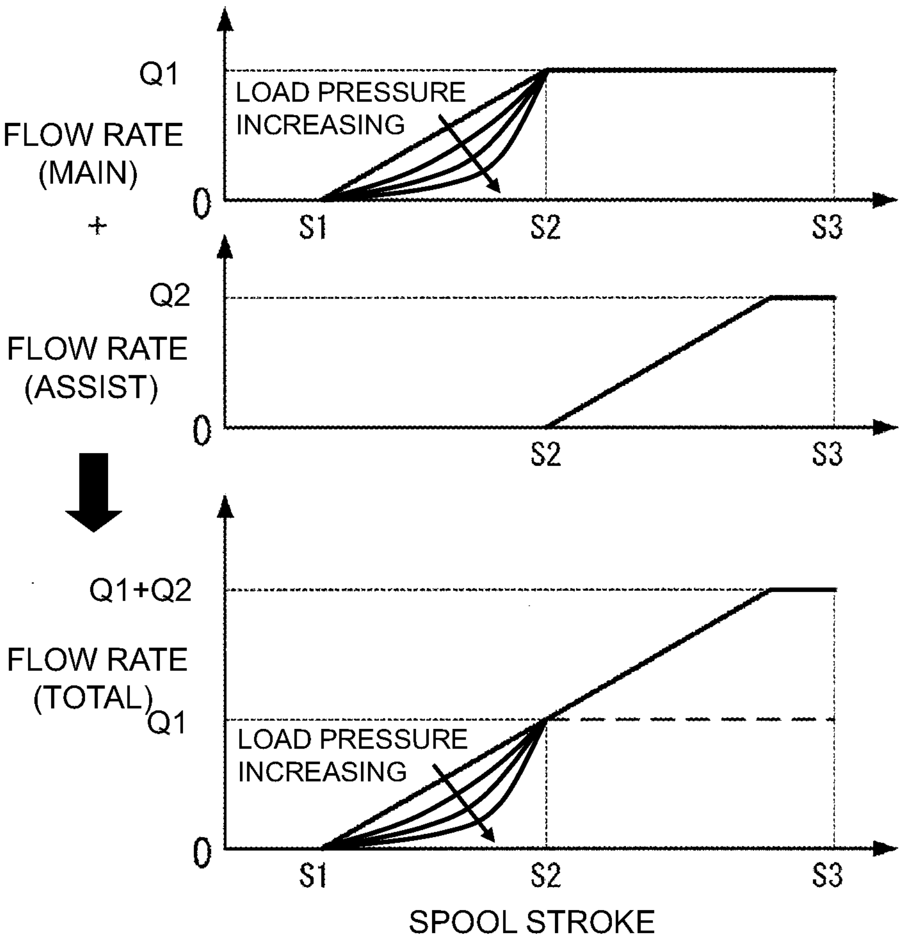
FIG. 5C shows graphs illustrating meter-in flow rate characteristics of the first and second flow control valves of the boom cylinder (upper graphs), and illustrating a combined meter-in flow rate characteristic of the first and second flow control valves of the boom cylinder (lower graph).

FIG. 5C shows graphs illustrating meter-in flow rate characteristics of the flow control valves 6*a* and 6*i* of the boom cylinder 3*a*. The upper graphs of FIG. 5C illustrate individually the meter-in flow rate characteristics of the flow control valves 6*a* and 6*i*.

In the flow control valve 6*a* for the main drive (first flow control valve), both the meter-in passage and the bleed-off passage are open until the spool stroke reaches the intermediate stroke S2, during which period a supply flow rate increases with increase in the spool stroke after the dead zone of 0 to S1 and the supply flow rate decreases with increase in load pressure. When the spool stroke reaches the intermediate stroke S2, the opening area of the bleed-off passage is zero and a total amount Q1 of the fluid delivered from the main pump 202 is supplied to the boom cylinder 3*a*.

The pressure compensating valve 7*b* controls the differential pressure across the flow control valve 6*i* for the assist drive (second flow rate control valve). The flow rate through the flow control valves 6*i* thus increases in proportion to the opening area of the meter-in passage and the flow control valve 6*i* exhibits a flow rate characteristic similar to the characteristic shown in FIG. 5B. Specifically, the supply of the hydraulic fluid to the boom cylinder 3*a* is started at the intermediate stroke S2 and the supply flow rate thereafter increases with increase in the spool stroke and then becomes a maximum supply flow rate Q2 immediately before the maximum spool stroke S3 is reached.

The lower graph of FIG. 5C is a graph illustrating a combined meter-in flow rate characteristic of the flow control valves 6*a* and 6*i* of the boom cylinder 3*a*.

The flow control valves 6*a* and 6*i* of the boom cylinder 3*a* are set to have the flow rate characteristics as described above. As a result, before the spool stroke reaches the intermediate stroke S2, the supply flow rate increases with increase in the spool stroke after the dead zone of 0 to S1 and the supply flow rate decreases with increase in load pressure. After the spool stroke reaches the intermediate stroke S2, the supply flow rate increases with increase in the spool stroke and then becomes a maximum supply flow rate of Q1+Q2 immediately before the maximum spool stroke S3 is reached.

Reference is made back to FIG. 1. The control valve 4 further includes a track combined operation detecting hydraulic line 53, a first selector valve 40, a second selector valve 146, and a third selector valve 246. Specifically, the track combined operation detecting hydraulic line 53 has an upstream side connected to a pilot hydraulic fluid supply line 31*b* (to be described later) via a restrictor 43 and has a downstream side connected to the tank via the operation detecting valves 8*b*, 8*c*, 8*d*, 8*f*, 8*g*, 8*i*, and 8*j*. The first selector valve 40, the second selector valve 146, and the third selector valve 246 are operated to change positions thereof on the basis of an operation detecting pressure generated by the track combined operation detecting hydraulic line 53.

The track combined operation detecting hydraulic line 53 operates as follows. Specifically, during a time not involving a track combined operation in which the actuator 3*f* as the left track motor (hereinafter referred to as a left track motor 3*f* as appropriate) and/or the actuator 3*g* as the right track motor (hereinafter referred to as a right track motor 3*g* as appropriate), and at least one of the actuators 3*a*, 3*b*, 3*c*, and 3*d* other than the left and right track motors that are connected to the first hydraulic fluid supply line 105 and the second hydraulic fluid supply line 205 are simultaneously driven, the track combined operation detecting hydraulic line 53 communicates with the tank via at least any of the operation detecting valves 8*a*, 8*b*, 8*c*, 8*d*, 8*f*, 8*g*, 8*i*, and 8*j*, to thereby develop a tank pressure in the hydraulic line 53. During the track combined operation, the operation detecting valves 8*f* and 8*g* and any of the operation detecting valves 8*a*, 8*b*, 8*c*, 8*d*, 8*i*, and 8*j* perform a stroke movement with the respective flow control valves to thereby interrupt the communication with the tank, so that the operation detecting pressure (operation detecting signal) is generated in the hydraulic line 53.

During a time not involving the track combined operation, the first selector valve 40 is placed in a first position (interruption position) on the lower side in FIG. 1 to thereby interrupt communication between the first hydraulic fluid supply line 105 and the second hydraulic fluid supply line 205. During the track combined operation, the first selector valve 40 is placed in a second position on the upper side in FIG. 1 by the operation detecting pressure generated by the track combined operation detecting hydraulic line 53, to thereby establish communication between the first hydraulic fluid supply line 105 and the second hydraulic fluid supply line 205.

During a time not involving the track combined operation, the second selector valve 146 is placed in a first position on the lower side in FIG. 1 to thereby guide the tank pressure to the shuttle valve 9*g* disposed most downstream in the second load pressure detecting circuit 132. During the track combined operation, the second selector valve 146 is placed in a second position on the upper side in FIG. 1 by the operation detecting pressure generated by the track combined operation detecting hydraulic line 53, to thereby guide the maximum load pressure Plmax1 detected by the first load pressure detecting circuit 131 (maximum load pressure of the actuators 3*a*, 3*b*, 3*d*, and 3*f* connected to the first hydraulic fluid supply line 105) to the shuttle valve 9*g* disposed most downstream in the second load pressure detecting circuit 132.

During a time not involving the track combined operation, the third selector valve 246 is placed in a first position on the lower side in FIG. 1 to thereby guide the tank pressure to the shuttle valve 9*f* disposed most downstream in the first load pressure detecting circuit 131. During the track combined operation, the third selector valve 246 is placed in a second position on the upper side in FIG. 1 by the operation detecting pressure generated by the track combined operation detecting hydraulic line 53, to thereby guide the maximum load pressure Plmax2 detected by the second load pressure detecting circuit 132 (maximum load pressure of the actuators 3*b*, 3*c*, and 3*g* connected to the second hydraulic fluid supply line 205) to the shuttle valve 9*f* disposed most downstream in the first load pressure detecting circuit 131.

By changing the positions of the first selector valve 40, the second selector valve 146, and the third selector valve 246 on the basis of the operation detecting pressure generated by the track combined operation detecting hydraulic line 53, during a time not involving the track combined operation (during a track individual operation), the left track motor 3*f* is driven by the hydraulic fluid delivered from the first delivery port 102*a* of the split-flow-type main pump 102 and the right track motor 3*g* is driven by the hydraulic fluid delivered from the second delivery port 102*b* of the split-flow-type main pump 102. During the track combined operation, the first selector valve 40 is placed in the second position to establish communication between the first hydraulic fluid supply line 105 and the second hydraulic fluid supply line 205. The first and second delivery ports 102*a* 102*b* then function as a single pump, so that the hydraulic fluid delivered from the first delivery port 102*a* of the main pump 102 is joined with the hydraulic fluid delivered from the second delivery port 102*b* of the main pump 102 and the the left track motor 3*f* and the right track motor 3*g* are driven with the joined hydraulic fluids.

Figure 7:
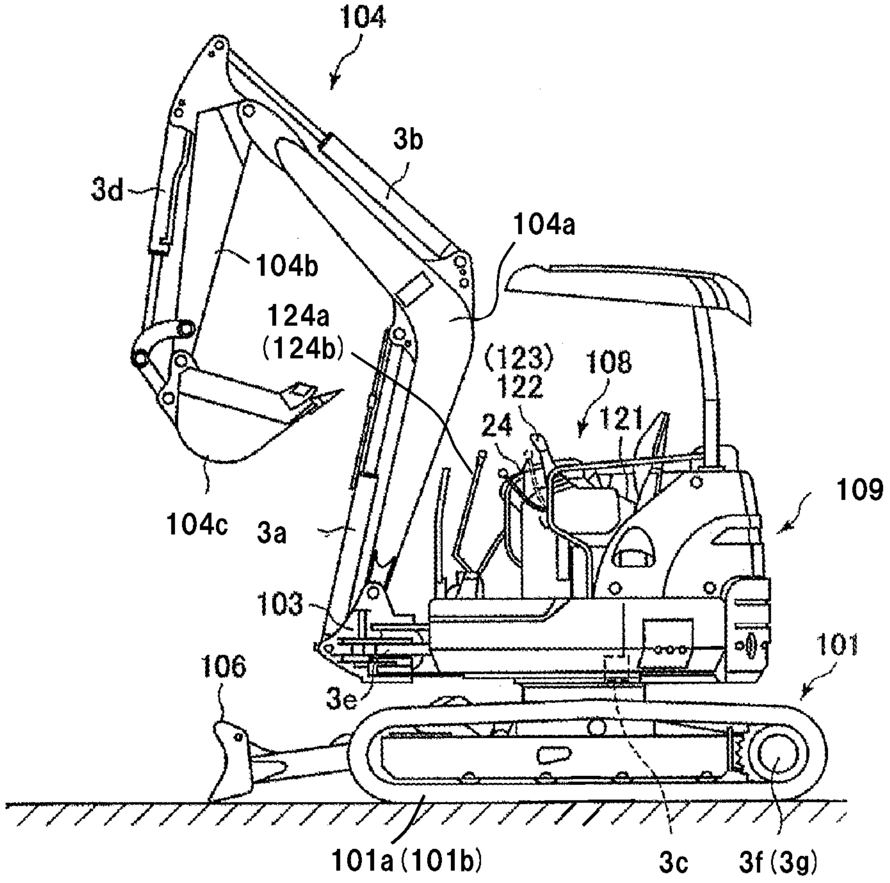
FIG. 7 is a diagram illustrating an appearance of a hydraulic excavator as a construction machine on which the hydraulic drive system of the present invention is mounted.

In addition, in FIG. 1, the hydraulic drive system in the present embodiment includes a fixed displacement pilot pump 30, a prime mover speed detecting valve 13, a pilot relief valve 32, a gate lock valve 100, and a plurality of operating units 122, 123, 124*a*, and 124*b* (FIG. 7). More specifically, the pilot pump 30 is driven by the prime mover 1. The prime mover speed detecting valve 13 is connected to a hydraulic fluid supply line 31*a* of the pilot pump 30 and detects a delivery flow rate of the pilot pump 30 as an absolute pressure Pgr. The pilot relief valve 32 is connected to the pilot hydraulic fluid supply line 31*b* downstream of the prime mover speed detecting valve 13 and generates a constant pilot primary pressure Ppilot in the pilot hydraulic fluid supply line 31*b*. The gate lock valve 100 is connected to the pilot hydraulic fluid supply line 31*b*. The gate lock valve 100 is operated by a gate lock lever 24 to thereby select whether to connect a downstream pilot hydraulic fluid supply line 31*c* to the pilot hydraulic fluid supply line 31*b* or the tank. The operating units 122, 123, 124*a*, and 124*b* include a plurality of remote control valves (reducing valves) that generate operating pilot pressures for controlling the flow control valves 6*a*, 6*b*, 6*c*, 6*d*, 6*e*, 6*f*, 6*g*, and 6*h* to be described later.

The prime mover speed detecting valve 13 includes a flow detecting valve 50 and a differential pressure reducing valve 51. Specifically, the flow detecting valve 50 is connected between the hydraulic fluid supply line 31*a* of the pilot pump 30 and the pilot hydraulic fluid supply line 31*b*. The differential pressure reducing valve 51 outputs a differential pressure across the flow detecting valve 50 as the absolute pressure Pgr.

The flow detecting valve 50 includes a variable restrictor 50*a* that increases an opening area with increase in the flow rate passing therethrough (delivery flow rate of the pilot pump 30). The hydraulic fluid delivered from the pilot pump 30 passes through the variable restrictor 50*a* to flow to the side of the pilot hydraulic line 31*b*. During this time, a differential pressure that increases with increase in the flow rate through the variable restrictor 50*a* develops across the variable restrictor 50*a* of the flow detecting valve 50. The differential pressure reducing valve 51 outputs this differential pressure as the absolute pressure Pgr. Because the delivery flow rate of the pilot pump 30 varies with the speed of the prime mover 1, detecting the differential pressure across the variable restrictor 50*a* allows the delivery flow rate of the pilot pump 30 to be detected, so that the speed of the prime mover 1 can be detected. The absolute pressure Pgr output by the prime mover speed detecting valve 13 (differential pressure reducing valve 51) is introduced to the regulator 112 as a target LS differential pressure. In the following, the absolute pressure Pgr output by the differential pressure reducing valve 51 will be referred to as an output pressure Pgr or a target LS differential pressure Pgr as appropriate.

The regulator 112 (first pump control unit) includes a low pressure selection valve 112*a*, an LS control valve 112*b*, an LS control piston 112*c*, torque control (horsepower control) pistons 112*e* and 112*d* (first torque control actuators), and a spring 112*u*. Specifically, the low pressure selection valve 112*a* selects a low pressure side of the LS differential pressure Pls1 output by the differential pressure reducing valve 111 and the LS differential pressure Pls2 output by the differential pressure reducing valve 211. The LS control valve 112*b* receives an LS differential pressure Pls12 selected as the low pressure side and the output pressure Pgr of the prime mover speed detecting valve 13 as the target LS differential pressure introduced thereto. The LS control valve 112*b* thereby varies a load sensing drive pressure (hereinafter referred to as an LS drive pressure) such that the LS differential pressure Pls12 lowers as the LS differential pressure Pls12 is smaller than the target LS differential pressure Pgr. The LS control piston 112*c* receives the LS drive pressure introduced thereto and controls a tilting angle (capacity) of the main pump 102 such that the tilting angle of the main pump 102 increases with a decreasing LS drive pressure to thereby increase the delivery flow rate. The torque control pistons 112*e* and 112*d* receive pressures at the first and second delivery ports 102*b* and 102*a* introduced thereto, respectively, and control the tilting angle of a swash plate of the main pump 102 such that the tilting angle of the main pump 102 is reduced to reduce absorption torque when the pressures increase. The spring 112*u* serves as a first urging means that sets maximum torque T12max (see FIG. 3A).

Further, the regulator 112 (first pump control unit) includes a reducing valve 112*g* and a reducing torque control piston 112*f*. Specifically, the reducing valve 112*g* receives the delivery pressure from the third delivery port 202*a* of the main pump 202 (pressure in the third hydraulic fluid supply line 305) introduced thereto. When this pressure is equal to or lower than a set pressure of a spring 112*t* (capacity limiting control starting pressure), the reducing valve 112*g* outputs the delivery pressure from the third delivery port 202*a* of the main pump 202 without reduction; when the delivery pressure from the third delivery port 202*a* of the main pump 202 is higher than the set pressure of the spring 112*t* (capacity limiting control starting pressure), the reducing valve 112*g* reduces the delivery pressure from the third delivery port 202*a* of the main pump 202 to the set pressure of the spring 112*t* (capacity limiting control starting pressure) and outputs the reduced pressure. The reducing torque control piston 112*f* receives the output pressure from the reducing valve 112*g* introduced thereto and reduces the capacity of the main pump 2 such that maximum torque (first predetermined value) of the main pump 102 decreases with increase in the output pressure of the reducing valve 112*g*.

The low pressure selection valve 112*a*, the LS control valve 112*b*, and the LS control piston 112*c* constitute a first load sensing control section that controls the capacity of the main pump 102 such that the delivery pressure of the main pump 102 (delivery pressure on the high pressure of the first and second delivery ports 102*a* and 102*b*) is higher by the target differential pressure (target LS differential pressure Pgr) than the maximum load pressure of the actuators driven by the hydraulic fluid delivered from the main pump 102 (pressure on the high pressure side of the maximum load pressure Plmax1 and the maximum load pressure Plmax2).

The torque control pistons 112*d* and 112*e*, the spring 112*u*, the reducing valve 112*g*, and the reducing torque control piston 112*f* constitute a first torque control section. The first torque control section controls to limit the capacity of the main pump 102 such that, when at least one of the delivery pressure of the first and second delivery ports 102*a* and 102*b* of the main pump 102 (delivery pressure of the main pump 102) and the capacity of the main pump 102 increases and the absorption torque of the main pump 102 increases, the absorption torque of the main pump 102 does not exceed the maximum torque (first predetermined value). It is noted that the maximum torque (first predetermined value) of the main pump 102 is variable over a range of T12max to T12max−T3max (to be described later).

The first load sensing control section (low pressure selection valve 112*a*, LS control valve 112*b*, and LS control piston 112*c*) functions to control the capacity of the main pump 102 through the load sensing control when the main pump 102 is not subject to torque control limiting by the first torque control section.

The regulator 212 (second pump control unit) includes a torque control (horsepower control) piston 212*d* (second torque control actuator) and a spring 212*e*. The torque control piston 212*d* receives delivery pressure P3 of the main pump 202 introduced thereto and controls the tilting angle of a swash plate of the main pump 202 such that the tilting angle of the main pump 202 is reduced to reduce the absorption torque when the pressures increase. The spring 212*e* serves as a second urging means that sets maximum torque T3max (see FIG. 3B).

The torque control piston 212*d* and the spring 212*e* constitute a second torque control section. When the delivery pressure P3 of main pump 202 increases and the absorption torque of the main pump 202 increases and when the absorption torque of the main pump 202 is equal to or lower than the maximum torque T3max (second predetermined value), the second torque control section maintains the capacity of the main pump 202 at a maximum q3max. When the absorption torque of the main pump 202 increases up to the maximum torque T3max (second predetermined value), the second torque control section controls to limit the capacity of the main pump 202 such that the absorption torque of the main pump 202 does not exceed the maximum torque T3max (second predetermined value).

The set pressure of the spring 112*t* of the reducing valve 112*g* is set to be equal to the capacity limiting control starting pressure as the set pressure of the spring 212 (hereinafter referred to as torque control starting pressure) P3*c* (FIGS. 4A and 4B) such that, when the absorption torque of the main pump 202 reaches the maximum torque T3max (second predetermined value), the delivery pressure of the third delivery port 202*a* of the main pump 202 is reduced to pressure corresponding to T3max (second predetermined value). In the following, the set pressure of the spring 112*t* of the reducing valve 112*g* is referred to as the set pressure of the reducing valve 112*g* as appropriate.

Figure 3:
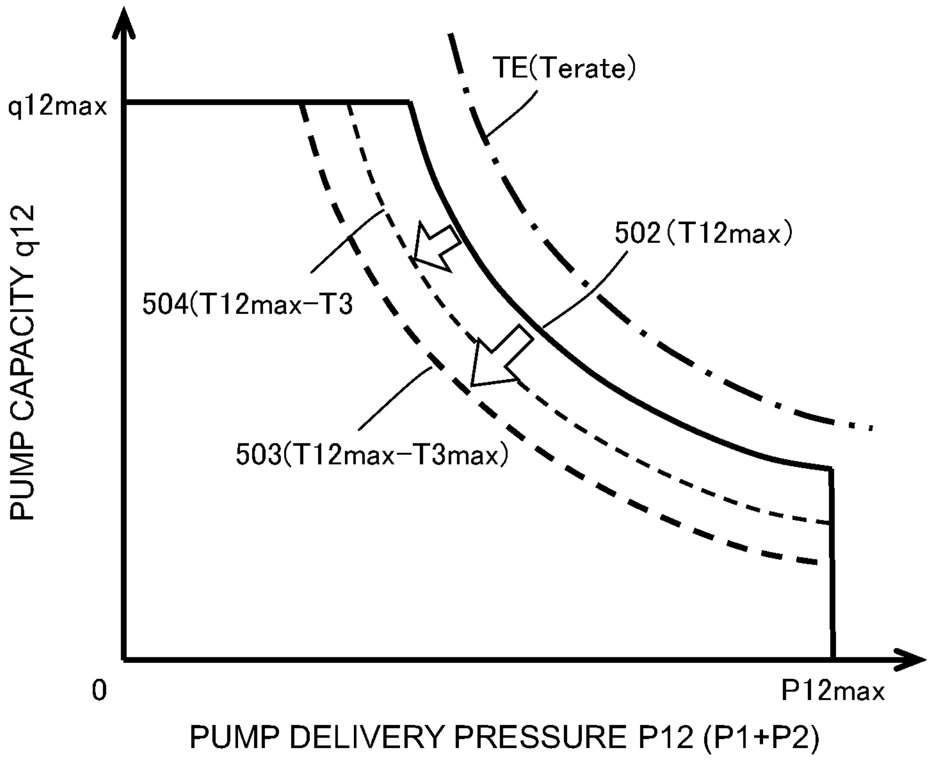
FIG. 3 is a graph illustrating a torque control characteristic (PQ characteristic) achieved by a first torque control section and effects achieved by reducing torque control by a reducing torque control piston.

FIG. 3 is a graph illustrating a torque control characteristic (PQ characteristic) achieved by the first torque control section (torque control pistons 112*d* and 112*e*, spring 112*u*, reducing valve 112*g*, and reducing torque control piston 112*f*) and effects achieved by the reducing torque control by the reducing torque control piston 112*f*. In FIG. 3, P12 on the abscissa denotes the total P1+P2 (delivery pressure of the main pump 102) of the pressures P1 and P2 of the first and second hydraulic fluid supply lines 105 and 205, q12 on the ordinate denotes the tilting angle of the swash plate (capacity) of the main pump 102, and q12max denotes a maximum tilting angle determined by a construction of the main pump 102. The absorption torque of the main pump 102 is given by a product of the delivery pressure P12 (P1+P2) of the main pump 102 and the tilting angle q12. Additionally, P12max on the abscissa denotes a maximum delivery pressure of the main pump 102 obtained by the set pressures of the main relief valves 114 and 214.

In FIG. 3, reference numeral 502 denotes a torque constant curve that represents the maximum absorption torque T12max of the main pump 102 set by the spring 112*u*. When the actuators associated with the main pump 202 are not operating and the delivery pressure of the main pump 202 introduced to the reducing torque control piston 112*f* is a tank pressure, and when the delivery pressure or the tilting angle of the main pump 102 increases and the absorption torque of the main pump 102 increases to reach the maximum torque T12max, the torque control pistons 112*d* and 112*e* of the regulator 112 control to limit the tilting angle of the main pump 102 such that the absorption torque of the main pump 102 does not further increase. For example, when the delivery pressure of the main pump 102 increases beyond the torque control starting pressure under a condition in which the main pump 102 is in a position of the maximum tilting angle q12max, the tilting angle q12 of the main pump 102 decreases along the torque constant curve 502. Additionally, when the tilting angle q12 of the main pump 102 is controlled to increase under a condition in which the tilting angle of the main pump 102 is at any point on the torque constant curve 502, the tilting angle q12 of the main pump 102 is controlled to be held at a tilting angle on the torque constant curve 502. In FIG. 3, reference numeral TE denotes a torque constant curve that represents rated output torque Terate of the prime mover 1. The maximum torque T12max is set to be smaller than Terate. Setting the maximum torque T12max in the foregoing manner to thereby keep the absorption torque of the main pump 102 below the maximum torque T12max allows the prime mover 1 to be prevented from stalling (engine stall) when the main pump 102 drives the actuators, while making the most out of the rated output torque Terate of the prime mover 1.

Figure 4A:
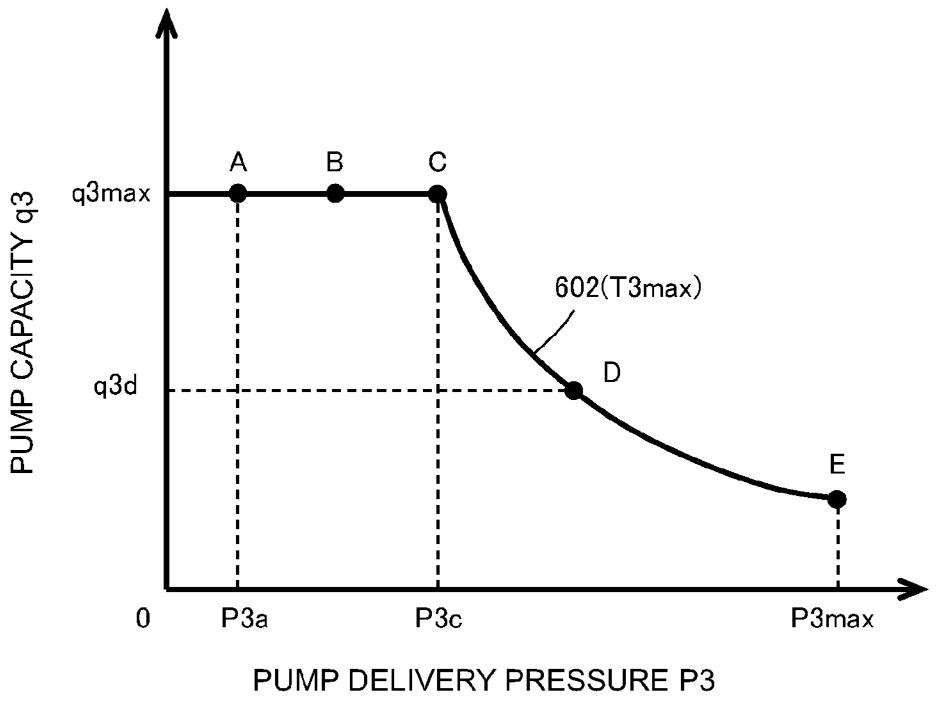
FIG. 4A is a graph illustrating, using a PQ characteristic, a torque control characteristic achieved by a second torque control section.
Figure 4B:
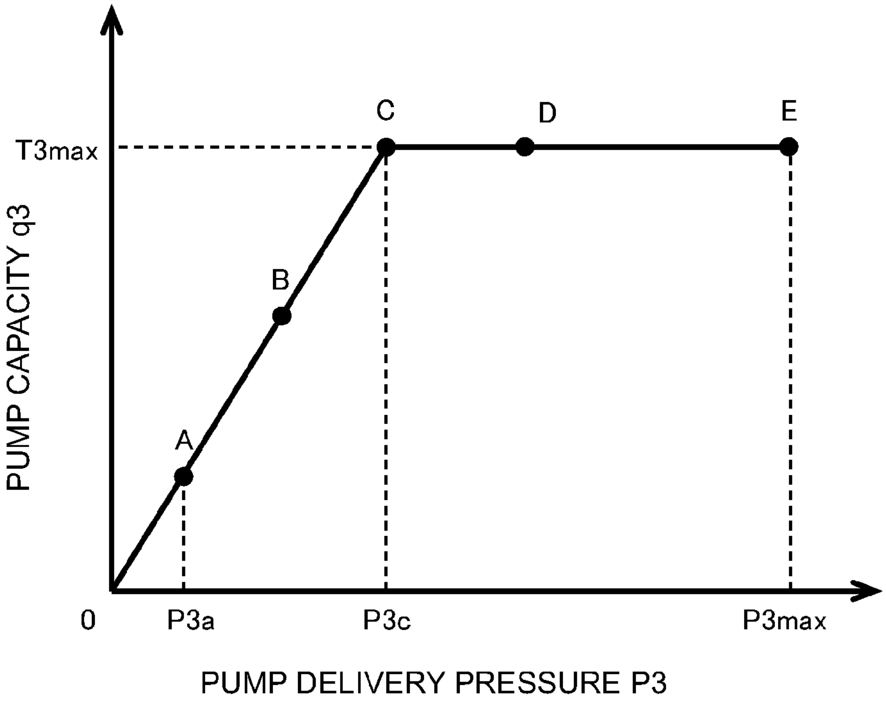
FIG. 4B is a graph illustrating the torque control characteristic achieved by the second torque control section with pump torque on the ordinate.

FIG. 4A is a graph illustrating a torque control characteristic (PQ characteristic) achieved by the second torque control section (torque control piston 212*d* and spring 212*e*). FIG. 4B is a graph illustrating the torque control characteristic with pump torque on the ordinate. In FIGS. 4A and 4B, P3 on the abscissa denotes the delivery pressure of the main pump 202, q3 and 13 on the ordinate denote the tilting angle of the swash plate (capacity) of the main pump 202 and the absorption torque of the main pump 202, respectively, and q3max denotes a maximum tilting angle determined by the construction of the main pump 202. The absorption torque of the main pump 202 is given by a product of the delivery pressure P3 of the main pump 202 and the tilting angle q3. Additionally, P3max on the abscissa denotes a maximum delivery pressure of the main pump 202 obtained by the set pressures of the main relief valve 314.

In FIG. 4A, reference numeral 602 denotes a torque constant curve that represents the maximum absorption torque T3max of the main pump 202 set by the spring 212*e*. When the delivery pressure of the third delivery port 202*a* of the main pump 202 is equal to or lower than the torque control starting pressure P3*c* (FIGS. 4A and 4B) that is the set pressure of the spring 112*u*, the capacity of the main pump 202 is constant at the maximum q3max and, as shown in FIG. 4B, the absorption torque of the main pump 202 increases linearly in proportion to an increasing delivery pressure. When the delivery pressure of the third delivery port 202*a* of the main pump 202 increases up to the torque control starting pressure P3*c*, the absorption torque of the main pump 202 reaches the maximum torque T3max. As in the regulator 112 shown in FIG. 3, the torque control piston 212*d* of the regulator 212 controls to limit the tilting angle of the main pump 202 such that the absorption torque of the main pump 202 does not further increase.

When the absorption torque (tilting angle) of the main pump 202 is controlled as described above, the delivery pressure (pressure of the third delivery port 202*a*) of the main pump 202 is introduced to the reducing torque control piston 112*f* via the reducing valve 112*g* and the reducing torque control to reduce the maximum torque T12max (first predetermined value) that is the set pressure of the spring 212*e* is performed.

Specifically, when the delivery pressure of the third delivery port 202*a* of the main pump 202 is equal to or lower than the torque control starting pressure P3*c* (FIGS. 4A and 4B), the output pressure of the reducing valve 112*g* increases with increase in the delivery pressure of the main pump 202 as with the absorption torque of the main pump 202 shown in FIG. 4B. When the delivery pressure of the third delivery port 202*a* of the main pump 202 reaches the torque control starting pressure P3*c*, the output pressure of the reducing valve 112*g* becomes constant as the delivery pressure of the main pump 202 increases, as with the absorption torque of the main pump 202. Additionally, the constant pressure corresponds to the maximum torque T3max (second predetermined value) of the main pump 202. As such, the reducing valve 112*g* outputs a pressure that simulates the absorption torque of the main pump 202 and this pressure is introduced to the reducing torque control piston 112*f*, so that control is performed to reduce the maximum torque of the main pump 102 (first predetermined value).

In FIG. 3, the arrows indicate the effects achieved by the reducing torque control by the reducing valve 112*g* and the reducing torque control piston 112*f*. When the absorption torque of the main pump 202 is equal to or lower than T3max (second predetermined value) during the increase in the delivery pressure of the main pump 202, the reducing valve 112*g* outputs the delivery pressure of the third delivery port 202*a* of the main pump 202 without reduction and the reducing torque control piston 112*f* reduces, as indicated by a torque constant curve 504 in FIG. 3, the maximum torque of the main pump 102 by the absorption torque (T3) of the main pump 202 from T12max of the torque constant curve 502. Additionally, when the delivery pressure of the main pump 202 increases and the absorption torque of the main pump 202 reaches T3max (second predetermined value), the reducing valve 112*g* reduces the delivery pressure of the third delivery port 202*a* of the main pump 202 to a pressure (torque control starting pressure P3*c*) corresponding to T3max (second predetermined value) and outputs the resultant pressure. The reducing torque control piston 112*f* reduces, as indicated by a torque constant curve 503 in FIG. 3, the maximum torque (first predetermined value) of the main pump 102 by the absorption torque (maximum torque) T3max of the main pump 202 from T12max of the torque constant curve 502 in FIG. 3.

Thus, even in a combined operation that simultaneously drives an actuator associated with the main pump 102 and an actuator associated with the main pump 202, or an operation that drives an actuator associated with both the main pump 102 and the main pump 202 (boom cylinder 3*a*), the total of the absorption torque of the main pump 102 and the absorption torque of the main pump 202 is controlled not to exceed the maximum torque T12max (total torque control or full horsepower control; hereinafter referred to as total torque control), so that the prime mover 1 can be prevented from stalling (engine stall). In addition, the reducing valve 112*g* outputs a pressure that simulates the absorption torque of the main pump 202 and this pressure is introduced to the reducing torque control piston 112*f* so as to reduce the maximum torque of the main pump 102. This arrangement enables the total torque control to be accurately performed not only when the main pump 202 operates at the maximum torque T3max as being limited by the second torque control section, but also when the main pump 202 is not subject to limitation by the second torque control section, so that the rated output torque Terate of the prime mover can be effectively used.

Hydraulic Excavator

FIG. 7 is a diagram illustrating an appearance of a hydraulic excavator on which the hydraulic drive system described above is mounted.

In FIG. 7, the hydraulic excavator well-known as a work machine includes a lower track structure 101, an upper swing structure 109, and a swing type front work implement 104. The front work implement 104 includes a boom 104*a*, an arm 104*b*, and a bucket 104*c*. The upper swing structure 109 can be swung with respect to the lower track structure 101 by a swing motor 3*c*. A swing post 103 is disposed at a front of the upper swing structure 109. The front work implement 104 is mounted vertically movably on the swing post 103. The swing post 103 is horizontally rotatable with respect to the upper swing structure 109 with extension and contraction of a swing cylinder 3*e*. The boom 104*a*, the arm 104*b*, and the bucket 104*c* of the front work implement 104 are vertically rotatable with extension and contraction of a boom cylinder 3*a*, an arm cylinder 3*b*, and a bucket cylinder 3*d*, respectively. A blade 106 is mounted at a center frame of the lower track structure 102. The blade 106 moves vertically with extension and contraction of a blade cylinder 3*h* (see FIG. 1). The lower track structure 101 travels through left and right crawlers 101*a* and 101*b* (only the left crawler is shown in FIG. 7) that are driven through rotation of track motors 3*f* and 3*g*.

A canopy type cabin 108 is mounted on the upper swing structure 109. The cabin 108 includes a driver's seat 121, the front/swing left and right operating units 122 and 123 (only the left operating unit is shown in FIG. 7), the traveling operating units 124*a* and 124*b* (only the left operating unit is shown in FIG. 7), a swing operating unit not shown, a blade operating unit not shown, and the gate lock lever 24. A control lever of each of the operating units 122 and 123 can be operated in longitudinal and lateral directions with reference to a neutral position. When the control lever of the left operating unit 122 is operated in the longitudinal direction, the operating unit 122 functions as a swing operating unit; when the control lever of the left operating unit 122 is operated in the lateral direction, the operating unit 122 functions as an arm operating unit. When the control lever of the right operating unit 123 is operated in the longitudinal direction, the operating unit 123 functions as a boom operating unit; when the control lever of the right operating unit 123 is operated in the lateral direction, the operating unit 123 functions as a bucket operating unit.

—Operation—

Operation in the present embodiment will be described below.

A hydraulic fluid delivered from the fixed displacement pilot pump 30 that is driven by the prime mover 1 is supplied to the hydraulic fluid supply line 31*a*. The prime mover speed detecting valve 13 is connected to the hydraulic fluid supply line 31*a*. The prime mover speed detecting valve 13 uses the flow detecting valve 50 and the differential pressure reducing valve 51 to output as the absolute pressure Pgr (target LS differential pressure) a differential pressure across the flow detecting valve 50 varying according to the delivery flow rate of the pilot pump 30. The pilot relief valve 32 is connected downstream of the prime mover speed detecting valve 13 and generates a constant pressure (pilot primary pressure Ppilot) in the pilot hydraulic fluid supply line 31*b*.

(a) When all Control Levers are in Neutral Positions

Because all control levers of the operating units are in their neutral positions, all of the flow control valves 6*a* to 6*j* are in their neutral positions. Because all of the flow control valves 6*a* to 6*j* are in their neutral positions, the first load pressure detecting circuit 13 and the second load pressure detecting circuit 132 associated with the flow control valves 8*b* to 8*d*, 8*f*, 8*g*, 8*i*, and 8*j* that are connected to the first and second hydraulic fluid supply lines 105 and 205 detect tank pressures as the maximum load pressures Plmax1 and Plmax2, respectively. The maximum load pressures Plmax1 and Plmax2 are introduced to the unloading valves 115 and 215, and the differential pressure reducing valves 111 and 211, respectively.

The maximum load pressures Plmax1 and Plmax2 being introduced to the unloading valves 115 and 215 cause the pressures P1 and P2 of the first and second delivery ports 102*a* and 102*b* to be maintained at minimum pressures that represent the maximum load pressures Plmax1 and Plmax2 to which the set pressures of the springs of the unloading valves 115 and 215 are added (unloading valve set pressures). Let Punsp be the spring set pressure for the unloading valves 115 and 215. Then, Punsp is normally set to be slightly higher than the output pressure Pgr of the prime mover speed detecting valve 13, specifically, the target LS differential pressure (Punsp>Pgr).

The differential pressure reducing valves 111 and 211 output differential pressures (LS differential pressures) between the pressures P1 and P2 of the first and second hydraulic fluid supply lines 105 and 205 and the maximum load pressures Plmax1 and Plmax2 (tank pressure) as the absolute pressures Pls1 and Pls2, respectively. The maximum load pressures Plmax1 and Plmax2 are each the tank pressure as described previously. Let Ptank be the tank pressure, then $$Pls1=P1-Plmax1=(Ptank+Punsp)-Ptank=Punsp>Pgr$$

$$Pls2=P2-Plmax2=(Ptank+Punsp)-Ptank=Punsp>Pgr$$

The LS differential pressures Pls1 and Pls2 are introduced to the low pressure selection valve 112*a* of the regulator 112.

Of the LS differential pressures Pls1 and Pls2 introduced to the low pressure selection valve 112*a*, the low pressure side is selected in the regulator 112 and introduced as the LS differential pressure Pls12 to the LS control valve 112*b*. Because Pls12>Pgr regardless of whichever is selected, Pls1 or Pls2, the LS control valve 122*b* is pushed to the left in FIG. 1 to be placed in the right position. Thus, the LS drive pressure increases to the constant pilot primary pressure Ppilot generated by the pilot relief valve 32 and the pilot primary pressure Ppilot is introduced to the LS control piston 112*c*. Because the pilot primary pressure Ppilot is introduced to the LS control piston 112*c*, the capacity (flow rate) of the main pump 102 is maintained at a minimum level.

Meanwhile, the hydraulic fluid delivered from the main pump 202 is introduced to the third hydraulic fluid supply line 305 and discharged into the tank by way of the bleed-off passage that is open with the open center type flow control valves 6*a*, 6*e*, and 6*h* in their neutral positions. As a result, the pressure in the third hydraulic fluid supply line 305 is an extremely low pressure that is slightly higher than the tank pressure by only an extremely small resistance produced when the hydraulic fluid delivered from the main pump 202 flows past the bleed-off passage of the flow control valves 6*a*, 6*e*, and 6*h*.

The pressure in the third hydraulic fluid supply line 305 (delivery pressure from the main pump 202) is introduced to the torque control (horsepower control) piston 212*d* disposed in the regulator 212 of the main pump 202. Because this pressure is low, the capacity (flow rate) of the main pump 202 is maintained at a maximum level.

In FIGS. 4A and 5B, point A indicates the condition of the main pump 202 at this time. The delivery pressure P3 of the main pump 202 is P3*a*, the capacity of the main pump 202 is the maximum q3max, and the delivery flow rate is the maximum.

Additionally, the delivery pressure of the main pump 202 is introduced to the reducing torque control piston 112*f* via the reducing valve 112*g*. At the reducing torque control piston 112*f*, force determined by a product of the delivery pressure of the main pump 202 and a pressure receiving surface area of the reducing torque control piston 112*f* acts in a direction in which the capacity (tilting angle) of the main pump 102 is reduced. However, the capacity (tilting angle) of the main pump 102 is maintained at the minimum level by the LS control piston 112*c* as described previously and this condition is maintained.

(b) When the Boom Control Lever is Operated (Fine Operation)

Consider a case in which an input of the control lever in a boom raising direction is small and the boom cylinder 3*a* is driven by only the open center type flow control valve 6*a*.

When the control lever of the boom operating unit (boom control lever) is operated in a direction in which the boom cylinder 3*a* is extended, specifically, in the boom raising direction, the remote control valve of the boom operating unit outputs a boom raising pilot pressure. The flow control valves 6*a* and 6*i* for driving the boom cylinder 3*a* are each then placed in an upper position in FIG. 1 according to the pressure.

When the operation on the boom control lever is a fine operation, the spool strokes of the flow control valves 6*a* and 6*i* are equal to or more than S1 and equal to or less than S2 in FIGS. 5A and 5B. At this time, the meter-in passage of the flow control valve 6*i* remains closed and the hydraulic fluid is supplied from the main pump 202 to a bottom side of the boom cylinder 3*a* only via the flow control valve 6*a*.

Because the spool stroke of the flow control valve 6*a* is equal to or more than S1 and equal to or less than S2, the bleed-off passage is not fully closed. As shown in the section between S1 and S2 of FIG. 5C, the flow rate determined by the load pressure on the boom cylinder 3*a*, the pressure of the third hydraulic fluid supply line 305 determined by the size of the opening area of the bleed-off passage and the flow rate supplied from the main pump 202, and the size of the opening area of the meter-in passage is supplied to the boom cylinder 3*a* and the rest of the flow rate is discharged into the tank from the bleed-off passage.

At this time, the pressure of the third hydraulic fluid supply line 305 (delivery pressure of the main pump 202) is introduced to the torque control (horsepower control) piston 212*d* disposed in the regulator 212 of the main pump 202. When the pressure of the third hydraulic fluid supply line 305 falls short of the torque control starting pressure P3*c* of the torque constant curve 602 set by the spring 212*e*, the capacity of the main pump 202 is maintained at the maximum qmax. When the pressure of the third hydraulic fluid supply line 305 is equal to or higher than the torque control starting pressure P3*c*, the capacity of the main pump 202 is reduced to a tilting position at which force of the piston 212*d* and force of the spring 212*e* balance each other.

For example, when the main pump 202 operates at point B indicated in FIGS. 4A and 5B, the capacity of the main pump 202 is maintained at the maximum q3max. When the load pressure on the boom cylinder 3*a* increases and the main pump 202 operates with the pressure of the third hydraulic fluid supply line 305 at point D higher than the torque control starting pressure P3*c* (point C) of FIG. 4A, the capacity is q3*d* on the torque constant curve 602 and the delivery flow rate is reduced to a value that is q3*d* multiplied by the speed of the prime mover 1. The absorption torque remains constant when the main pump 202 operates on the torque constant curve 602. The main pump 202 performs the torque control (horsepower control) so as to make the absorption torque of the main pump 202 constant, when the pressure of the third hydraulic fluid supply line 305 (delivery pressure of the main pump 202) increases to a level higher than P3*c* as described above.

Additionally, the pressure of the third hydraulic fluid supply line 305 (delivery pressure of the main pump 202) is introduced to the reducing valve 112*g* disposed in the regulator 112 of the main pump 102. When the pressure of the third hydraulic fluid supply line 305 (delivery pressure of the main pump 202) is equal to or lower than the set pressure (torque control starting pressure) P3*c* of the reducing valve 112*g*, the pressure of the third hydraulic fluid supply line 305 is directly introduced to the reducing torque control piston 112*f*. When the pressure of the third hydraulic fluid supply line 305 is higher than P3*c*, a pressure limited to P3*c* is introduced to the reducing torque control piston 112*f*. At the reducing torque control piston 112*f*, force determined by the product of the delivery pressure of the main pump 202 and the pressure receiving surface area of the reducing torque control piston 112*f* acts in the direction in which the capacity (tilting angle) of the main pump 102 is reduced. However, the current operation on the boom control lever is a fine operation and the capacity of the main pump 102 is maintained at the minimum level as described previously, so that this condition is maintained.

(c) When the Boom Control Lever is Operated (Full Operation)

Consider a case in which an input of the control lever in the boom raising direction is large and the boom cylinder 3*a* is driven by both the open center type flow control valve 6*a* and the closed center type flow control valve 6*i*.

When the boom control lever is fully operated in a direction in which the boom cylinder 3*a* is extended, specifically, in the boom raising direction, the flow control valves 6*a* and 6*i* for driving the boom cylinder 3*a* change their positions upwardly in FIG. 1. Then, as shown in FIGS. 5A and 5B, the spool strokes of the flow control valves 6*a* and 6*i* are S3, the bleed-off passage of the flow control valve 6*a* is fully closed, the opening area of the meter-in passage is maintained at the maximum A4 (fully open), and the opening area of the meter-in passage of the flow control valve 6*i* is the maximum A6 (fully open).

Thus, in the flow control valve 6*a*, the hydraulic fluid is supplied from the main pump 202 to the boom cylinder 3*a* via the meter-in passage of the flow control valve 6*a* as in the case of (b) fine operation. Because the bleed-off passage is fully closed in this case, however, the total amount Q1 of the hydraulic fluid of the main pump 202 is introduced to the boom cylinder 3*a* as indicated by S3 in the upper graph of FIG. 5C.

The capacity of the main pump 202 is controlled by the PQ characteristic shown in FIG. 4A and the main pump 202 delivers a flow rate corresponding to the magnitude of the pressure P3 of the third hydraulic fluid supply line 305. Specifically, when the pressure P3 of the third hydraulic fluid supply line 305 is lower than P3*c*, the capacity of the main pump 202 is the maximum q3max and the main pump 202 delivers the maximum flow rate. When the pressure P3 of the third hydraulic fluid supply line 305 is equal to or higher than P3*c*, the capacity of the main pump 202 is controlled to follow along the torque constant curve 602 within the range between point C and point E.

Meanwhile, the load pressure on the bottom side of the boom cylinder 3*a* is detected as the maximum load pressure Plmax1 by the first load pressure detecting circuit 131 via the load port of the flow control valve 6*i* and introduced to the unloading valve 115 and the differential pressure reducing valve 111. The maximum load pressure Plmax1 being introduced to the unloading valve 115 causes the set pressure of the unloading valve 115 to increase to a level that represents the maximum load pressure Plmax1 (load pressure on the bottom side of the boom cylinder 3*a*) to which the spring set pressure Punsp is added, and the hydraulic line through which the hydraulic fluid of the first hydraulic fluid supply line 105 is discharged to the tank is interrupted. Additionally, the maximum load pressure Plmax1 being introduced to the differential pressure reducing valve 111 causes the differential pressure reducing valve 111 to output as the absolute pressure Pls1 the differential pressure (LS differential pressure) between the pressure P1 of the first hydraulic fluid supply line 105 and the maximum load pressure Plmax1. The absolute pressure Pls1 is introduced to the low pressure selection valve 112*a* of the regulator 112 and the low pressure selection valve 112*a* selects the low pressure side of Pls1 and Pls2.

In a full operation for boom raising, Pls2 is maintained at a value greater than Pgr as when the control lever is in the neutral position (Pls2=P2−Plmax2=(Ptank+Punsp)−Ptank=Punsp>Pgr). At a motion start for boom raising, the LS differential pressure Pls1 is nearly equal to zero and a relation of Pls1<Pgr holds. Thus, Pls1 is selected as the low pressure side LS differential pressure Pls12 by the low pressure selection valve 112*a* and introduced to the LS control valve 112*b*. The LS control valve 112*b* compares the target LS differential pressure Pgr with the LS differential pressure Pls1. In this case, because Pls1<Pgr, the LS control valve 112*b* is placed in the right position in FIG. 1, so that the hydraulic fluid of the LS control piston 112*c* is discharged into the tank. As a result, the LS drive pressure is reduced. When the main pump 102 is not subject to torque control limitation by the first torque control section (torque control pistons 112*d* and 112*e*, spring 112*u*, reducing valve 112*g*, and reducing torque control piston 112*f*), the capacity (flow rate) of the main pump 102 increases and the flow rate of the main pump 102 is controlled such that Pls1 is equal to Pgr.

Then, as shown by S3 in the lower graph of FIG. 5C, the hydraulic fluid supplied from the main pump 202 via the flow control valve 6*a* and the hydraulic fluid supplied from the first delivery port 102*a* of the main pump 102 via the flow control valve 6*i* are joined each other and are supplied to the boom cylinder 3*a*, so that the boom cylinder 3*a* is driven in the extending direction by the joined hydraulic fluids.

At this time, the hydraulic fluid at the same flow rate as that of the hydraulic fluid supplied to the first hydraulic fluid supply line 105 is supplied to the second hydraulic fluid supply line 205; however, the hydraulic fluid is returned as an excess flow rate to the tank via the unloading valve 215.

It is here noted that the second load pressure detecting circuit 132 detects the tank pressure as the maximum load pressure Plmax2. Thus, the set pressure of the unloading valve 215 equals the spring set pressure Punsp, so that the pressure P2 of the second hydraulic fluid supply line 205 is maintained at the low pressure Punsp. This reduces pressure loss of the unloading valve 215 when the excess flow rate returns to the tank, enabling operation involving less energy loss.

When the delivery fluid of the main pump 202 and the delivery fluid of the main pump 102 are joined and supplied to the boom cylinder, the bleed-off passage of the open center type flow control valve 6*a* on the main pump 202 side is fully closed, while on the main pump 102 side, the load sensing control controls the delivery flow rate of the main pump 102. Thus, in an operation involving a large operation amount of the boom control lever, such as loading following excavating by the hydraulic excavator, a characteristic less susceptible to the effect of load pressure can be obtained and powerful operating feeling can be obtained.

When the main pump 102 is subject to the torque control limitation by the first torque control section (torque control pistons 112*d* and 112*e*, spring 112*u*, reducing valve 112*g*, and reducing torque control piston 112*f*), the capacity of the main pump 102 is controlled by the PQ characteristic shown in FIG. 3. Specifically, the delivery pressure of the main pump 102 (total of the pressures of the first and second hydraulic fluid supply lines 105 and 205) increases and, when the absorption torque of the main pump 102 reaches the maximum torque (first predetermined value), the capacity of the main pump 102 is controlled such that the maximum torque (first predetermined value) is not exceeded.

The pressure P3 of the third hydraulic fluid supply line 305 is introduced to the reducing valve 112*g* disposed in the regulator 112 of the main pump 102. When the pressure P3 of the third hydraulic fluid supply line 305 is equal to or lower than the set pressure (torque control starting pressure) P3*c* of the reducing valve 112*g*, the pressure P3 is directly introduced to the reducing torque control piston 112*f*. When the pressure P3 of the third hydraulic fluid supply line 305 is higher than P3*c*, a pressure limited to P3*c* is introduced to the reducing torque control piston 112*f*. The reducing torque control piston 112*f* performs the following reducing torque control as described previously. Specifically, when the pressure P3 of the third hydraulic fluid supply line 305 is equal to or lower than the set pressure P3*c* of the reducing valve 112*g*, the reducing torque control piston 112*f* reduces the maximum torque of the main pump 102 by the absorption torque of the main pump 202 (T3) as indicated by the torque constant curve 504 in FIG. 3. When the pressure P3 of the third hydraulic fluid supply line 305 is higher than the set pressure P3*c* of the reducing valve 112*g*, the reducing torque control piston 112*f* reduces the maximum torque of the main pump 102 by the absorption torque of the main pump 202 (maximum torque T3max) as indicated by the torque constant curve 503 in FIG. 3.

As described above, the reducing valve 112*g* outputs a pressure that simulates the absorption torque of the main pump 202 and this pressure is introduced to the reducing torque control piston 112*f* so as to reduce the maximum torque of the main pump 102. This arrangement enables the total torque control to be accurately performed not only when the main pump 202 operates at the maximum torque T3max as being limited by the second torque control section, but also when the main pump 202 is not subject to limitation by the second torque control section, so that the rated output torque Terate of the prime mover can be effectively used.

(d) When the Arm Control Lever is Operated (Fine Operation)

When, for example, the control lever of the arm operating unit (arm control lever) is operated in a direction in which the arm cylinder 3*b* is extended, specifically, in an arm crowding direction, the flow control valves 6*b* and 6*j* for driving the arm cylinder 3*b* change their positions downwardly in FIG. 1. It is noted that the flow control valves 6*b* and 6*j* for driving the arm cylinder 3*b* exhibit an opening area characteristic that is such that the flow control valve 6*b* is for main drive and the flow control valve 6*j* is for assist drive as described previously with reference to FIG. 2B. The flow control valves 6*b* and 6*j* each make a stroke movement according to the operating pilot pressure output by the pilot valve of the operating unit.

When the operation on the arm control lever is a fine operation and the stroke of the flow control valves 6*b* and 6*j* is equal to or less than S2 in FIG. 2B, the opening area of the meter-in passage of the main drive flow control valve 6*b* increases from zero to Al with increase in the operation amount of the arm control lever (operating pilot pressure). The opening area of the meter-in passage of the assist drive flow control valve 6*j* is maintained at zero.

When the flow selector valve 6*b* is placed in the downward position in FIG. 1, the second load pressure detecting circuit 132 detects as the maximum load pressure Plmax2 the load pressure on the bottom side of the arm cylinder 3*b* via the load port of the flow control valve 6*b* and the load pressure is introduced to the unloading valve 215 and the differential pressure reducing valve 211. The maximum load pressure Plmax2 being introduced to the unloading valve 215 causes the set pressure of the unloading valve 215 to increase to a level that represents the maximum load pressure Plmax2 (load pressure on the bottom side of the arm cylinder 3*b*) to which the spring set pressure Punsp is added, and the hydraulic line through which the hydraulic fluid of the second hydraulic fluid supply line 205 is discharged to the tank is interrupted. Additionally, the maximum load pressure Plmax2 being introduced to the differential pressure reducing valve 211 causes the differential pressure reducing valve 211 to output as the absolute pressure Pls2 the differential pressure (LS differential pressure) between the pressure P2 of the second hydraulic fluid supply line 205 and the maximum load pressure Plmax2. The absolute pressure Pls2 is introduced to the low pressure selection valve 112*a* of the regulator 112 and the low pressure selection valve 112*a* selects the low pressure side of Pls1 and Pls2.

Immediately after the operation of the control lever during the arm crowding start, the load pressure on the arm cylinder 3*b* is transmitted to the second hydraulic fluid supply line 205 and there is substantially no difference between both, so that the LS differential pressure Pls2 is substantially equal to zero and a relation of Pls2<Pgr holds. At this time, Pls1 is maintained at a value greater than Pgr as when the control lever is in the neutral position (Pls1=P1−Plmax1=(Ptank+Punsp)−Ptank=Punsp>Pgr). Thus, the low pressure selection valve 112*a* selects Pls2 as the LS differential pressure Pls12 on the low pressure side and Pls2 is introduced to the LS control valve 112*b*. The LS control valve 112*b* compares the output pressure Pgr of the prime mover speed detecting valve 13 as the target LS differential pressure with Pls2. In this case, because the relation of Pls2<Pgr holds as mentioned above, the LS control valve 112*b* is placed in the right position in FIG. 1 and the hydraulic fluid of the LS control piston 112*c* is discharged into the tank. As a result, the capacity (flow rate) of the main pump 102 increases and the increase in the flow rate continues until Pls2=Pgr. This results in the hydraulic fluid at the flow rate corresponding to the operation on the arm control lever being supplied from the second delivery port 102*b* of the main pump 102 to the bottom side of the arm cylinder 3*b*, so that the arm cylinder 3*b* is driven in the extending direction.

At this time, the hydraulic fluid at the same flow rate as that of the hydraulic fluid supplied to the second hydraulic fluid supply line 205 is supplied to the first hydraulic fluid supply line 105; however, the hydraulic fluid is returned as an excess flow rate to the tank via the unloading valve 115. It is here noted that the first load pressure detecting circuit 131 detects the tank pressure as the maximum load pressure Plmax1. Thus, the set pressure of the unloading valve 115 equals the spring set pressure Punsp, so that the pressure P1 of the first hydraulic fluid supply line 105 is maintained at the low pressure Punsp. This reduces pressure loss of the unloading valve 115 when the excess flow rate returns to the tank, enabling operation involving less energy loss.

Because the actuators associated with the main pump 202 are not driven at this time, the delivery pressure of the main pump 202 is extremely low in a similar manner as when all control levers are in their neutral positions. This low pressure is introduced to the torque feedback piston 112*f* without being reduced by the reducing valve 112*g*. The maximum torque of the main pump 102 shown in FIG. 3 is maintained at T12max of the curve 502 in FIG. 3.

(e) When the Arm Control Lever is Operated (Full Operation)

When, for example, the arm control lever is fully operated in a direction in which the arm cylinder 3*b* is extended, specifically, in an arm crowding direction, the flow control valves 6*b* and 6*j* for driving the arm cylinder 3*b* are placed in downward positions in FIG. 1. Then, as shown in FIG. 2B, the spool strokes of the flow control valves 6*b* and 6*j* are equal to or more than S2, the opening area of the meter-in passage of the flow control valve 6*b* is maintained at Al, and the opening area of the meter-in passage of the flow control valve 6*j* is A2.

As described previously in (d), the second load pressure detecting circuit 132 detects as the maximum load pressure Plmax2 the load pressure on the bottom side of the arm cylinder 3*b* via the load port of the flow control valve 6*b* and the unloading valve 215 interrupts the hydraulic line through which the hydraulic fluid of the second hydraulic fluid supply line 205 is discharged to the tank. Additionally, the maximum load pressure Plmax2 being introduced to the differential pressure reducing valve 211 causes the LS differential pressure Pls2 to be output and to be introduced to the low pressure selection valve 112*a* of the regulator 112.

Meanwhile, the load pressure on the bottom side of the arm cylinder 3*b* is detected as the maximum load pressure Plmax1 (=Plmax2) by the first load pressure detecting circuit 131 via the load port of the flow control valve 6*j* and introduced to the unloading valve 115 and the differential pressure reducing valve 111. The maximum load pressure Plmax1 being introduced to the unloading valve 115 causes the unloading valve 115 to interrupt the hydraulic line through which the hydraulic fluid of the first hydraulic fluid supply line 105 is discharged to the tank. The maximum load pressure Plmax1 being introduced to the differential pressure reducing valve 111 causes the LS differential pressure Pls1 (=Pls2) to be introduced to the low pressure selection valve 112*a* of the regulator 112.

Immediately after the operation of the control lever during the arm crowding start, the load pressure on the arm cylinder 3*b* is transmitted to the first and second hydraulic fluid supply lines 105 and 205 to thereby produce substantially no difference between the two pressures. Thus, both of the LS differential pressures Pls1 and Pls2 are substantially equal to zero and a relation of Pls1, Pls2<Pgr holds. Thus, the low pressure selection valve 112*a* selects either Pls1 or Pls2 as the LS differential pressure Pls12 on the low pressure side, so that Pls12 is introduced to the LS control valve 112*b*. In this case, because Pls12 (Pls1 or Pls2)<Pgr as mentioned above, the LS control valve 112*b* is placed in the right position in FIG. 1 and the hydraulic fluid of the LS control piston 112*c* is discharged to the tank. As a result, the capacity (flow rate) of the main pump 102 increases and the increase in the flow rate continues until Pls12=Pgr. This results in the hydraulic fluid at the flow rate corresponding to the operation on the arm control lever being supplied from the first and second delivery ports 102*a* and 102*b* of the main pump 102 to the bottom side of the arm cylinder 3*b*, so that the arm cylinder 3*b* is driven in the extending direction by the joined hydraulic fluids from the first and second delivery ports 102*a* and 102*b*.

Because the actuators associated with the main pump 202 are not driven at this time, too, the delivery pressure of the main pump 202 is extremely low in a similar manner as when all control levers are in their neutral positions. This low pressure is introduced to the torque feedback piston 112*f* without being reduced by the reducing valve 112*g*. The maximum torque of the main pump 102 shown in FIG. 3 is maintained at T12max of the curve 502 in FIG. 3.

Through the foregoing arrangements, the first torque control section controls the tilting angle of the main pump 102 such that the absorption torque of the main pump 102 does not exceed the maximum torque T12max, so that the prime mover 1 can be prevented from stalling (engine stall) when the load on the arm cylinder 3*b* increases.

(f) Horizontally Leveling Operation and Sweeping Work

In a horizontally leveling operation and sweeping work, typically the arm control lever is operated as an arm crowding full operation and the boom control lever is operated as a boom raising fine operation.

Because the boom raising is a fine operation, the boom cylinder 3*a* is driven by only the hydraulic fluid supplied from the main pump 202 via the open center type flow control valve 6*a* as described previously in (b). Additionally, the spool stroke of the flow control valve 6*a* is equal to or more than S1 and equal to or less than S2 and the bleed-off passage is not fully closed. As shown in the section between S1 and S2 of FIG. 5C, the flow rate determined by the load pressure on the boom cylinder 3*a*, the pressure of the third hydraulic fluid supply line 305 determined by the size of the opening area of the bleed-off passage and the flow rate supplied from the main pump 202, and the size of the opening area of the meter-in passage is supplied to the boom cylinder 3*a* and the rest of the flow rate is discharged into the tank from the bleed-off passage.

In contrast, the operation of the arm control lever is a full operation and, as described previously in (e), the flow control valve 6*b* for the main drive and the flow control valve 6*j* for the assist drive for the arm cylinder 3*b* change their positions through a full stroke and the opening areas of the meter-in passages are Al and A2, respectively. The load pressure on the arm cylinder 3*b* is detected as the maximum load pressures Plmax1 and Plmax2 (Plmax1=Plmax2) by the first and second load pressure detecting circuits 131 and 132 via the load ports of the flow control valves 6*b* and 6*j* and the unloading valves 115 and 215 interrupt the hydraulic lines through which the hydraulic fluids of the first and second hydraulic fluid supply lines 105 and 205 are discharged to the tank, respectively. Additionally, the maximum load pressures Plmax1 and Plmax2 are fed back to the regulator 112 of the main pump 102. When the main pump 102 is not subject to the torque control limitation by the first torque control section (torque control pistons 112*d* and 112*e*, spring 112*u*, reducing valve 112*g*, and reducing torque control piston 112*f*), the capacity (flow rate) of the main pump 102 increases corresponding to the demanded flow rates of the flow control valves 6*b* and 6*j*, so that the hydraulic fluid at the flow rate corresponding to the operation on the arm control lever is supplied from the first and second delivery ports 102*a* and 102*b* of the main pump 102 to the bottom side of the arm cylinder 3*b*. Thus, the arm cylinder 3*b* is driven in the extending direction by the joined hydraulic fluids from the first and second delivery ports 102*a* and 102*b*.

The horizontally leveling operation very often involves a low load pressure on the arm cylinder 3*b* and a high load pressure on the boom cylinder 3*a*. In the horizontally leveling operation according to the present embodiment, a specific pump is assigned for driving a specific actuator having a specific load pressure; specifically, the hydraulic pump that drives the boom cylinder 3*a* is the main pump 202, while the hydraulic pump that drives the arm cylinder 3*b* is the main pump 102. In this respect, unlike the related-art one-pump load sensing system that includes a single pump for driving a plurality of actuators, each actuator having a specific load pressure, the present embodiment does not consume energy as a result of wasted restricting pressure loss at the pressure compensating valve 7*b* on the low load side.

Because the boom cylinder 3*a* is controlled by the open center type flow control valve 6*a*, the bleed-off passage is open in the fine operation zone thereof and, as indicated by the section between S1 and S2 in FIG. 5C, the flow rate of the hydraulic fluid supplied to the boom cylinder 3*a* flexibly changes depending on the load pressure on the boom cylinder 3*a*. As a result, when reaction that is received from the bucket claw end when the bucket claw end is moved along the ground during, for example, sweeping work, slightly changes, the flow rate of the hydraulic fluid supplied to the boom cylinder 3*a* changes according to the magnitude of the reaction, so that favorable operability can be obtained.

When the main pump 102 is subject to the torque control limitation by the first torque control section (torque control pistons 112*d* and 112*e*, spring 112*u*, reducing valve 112*g*, and reducing torque control piston 112*f*), the capacity of the main pump 102 is controlled by the PQ characteristic shown in FIG. 3. Specifically, the delivery pressure of the main pump 102 (total of the pressures of the first and second hydraulic fluid supply lines 105 and 205) increases and, when the absorption torque of the main pump 102 reaches the maximum torque (first predetermined value), the capacity of the main pump 102 is controlled such that the maximum torque (first predetermined value) is not exceeded.

Additionally, as described previously in (c), the pressure P3 of the third hydraulic fluid supply line 305 is introduced to the reducing valve 112*g* disposed in the regulator 112 of the main pump 102. When the pressure P3 of the third hydraulic fluid supply line 305 is equal to or lower than the set pressure P3*c* (torque control starting pressure) of the reducing valve 112*g*, the pressure P3 is directly introduced to the reducing torque control piston 112*f*. When the pressure P3 of the third hydraulic fluid supply line 305 is higher than P3*c*, a pressure limited to P3*c* is introduced to the reducing torque control piston 112*f*. The reducing torque control piston 112*f* performs the following reducing torque control as described previously. Specifically, when the pressure P3 of the third hydraulic fluid supply line 305 is equal to or lower than the set pressure P3*c* of the reducing valve 112*g*, the reducing torque control piston 112*f* reduces the maximum torque of the main pump 102 by the absorption torque of the main pump 202 (T3) as indicated by the torque constant curve 504 in FIG. 3. When the pressure P3 of the third hydraulic fluid supply line 305 is higher than the set pressure P3*c* of the reducing valve 112*g*, the reducing torque control piston 112*f* reduces the maximum torque of the main pump 102 by the absorption torque of the main pump 202 (maximum torque T3max) as indicated by the torque constant curve 503 in FIG. 3.

As described above, the reducing valve 112*g* outputs a pressure that simulates the absorption torque of the main pump 202 and this pressure is introduced to the reducing torque control piston 112*f* so as to reduce the maximum torque of the main pump 102. This arrangement enables the total torque control to be accurately performed not only when the main pump 202 operates at the maximum torque T3max as being limited by the second torque control section, but also when the main pump 202 is not subject to limitation by the second torque control section, so that the rated output torque Terate of the prime mover can be effectively used.

—Effects—

The present embodiment achieves the following effects.

1. Even in a combined operation that involves a considerable difference in load pressure between the boom cylinder 3*a* and the arm cylinder 3*b*, such as the horizontally leveling operation in which the load pressure on the boom cylinder 3*a* is high and the load pressure on the arm cylinder 3*b* is low, the boom cylinder 3*a* and the arm cylinder 3*b* are driven by the hydraulic fluids from the main pumps 202 and 102, respectively. This arrangement prevents occurrence of energy consumption that arises from wasted restricting pressure loss at the pressure compensating valve on the low pressure side, when such a problem occurs in the related-art one-pump load sensing system that includes a single pump for driving a plurality of actuators. The embodiment can thus provide a highly efficient hydraulic drive system.

2. The flow control valve 6*a* that controls the flow of the hydraulic fluid supplied from the main pump 202 to the boom cylinder 3*a* is an open center type. Thus, in a fine operation zone in which the lever operation amount of the operating unit for the boom cylinder 3*a* is small, the bleed-off passage is open and the load pressure on the boom cylinder 3*a* varies flexibly the flow rate of the hydraulic fluid supplied to the boom cylinder 3*a*. Thus, when reaction that is received from the bucket claw end when the bucket claw end is moved along the ground during, for example, the sweeping work, slightly changes, the flow rate of the hydraulic fluid supplied to the boom cylinder 3*a* changes according to the magnitude of the reaction, so that favorable operability can be obtained.

3. Increasing the lever operation amount of the boom cylinder 3*a* causes the bleed-off passage of the open center type flow control valve 6*a* on the main pump 202 side to be fully closed; while on the main pump 102 side, the increase causes the load sensing control to control the delivery flow rate of the main pump 102. Thus, in an operation involving a large operation amount of the boom control lever, such as loading following excavating by the hydraulic excavator, a characteristic less susceptible to the effect of load pressure can be obtained and powerful operating feeling can be obtained.

4. The regulator 212 of the main pump 202 does not include a load sensing control section, but includes only the second torque control section (torque control piston 212$d$ and spring 212$e$). In addition, the set pressure of the reducing valve 112$g$ (set pressure of the spring 112$t$) is set to be equal to the torque control starting pressure of the second torque control section (set pressure of the spring 212) P3$c$. Thus, the reducing valve 112$g$ outputs a pressure that simulates the absorption torque of the main pump 202 and this pressure is introduced to the reducing torque control piston 112$f$. This arrangement enables the total torque control to be accurately performed not only when the main pump 202 operates at the maximum torque T3max as being limited by the second torque control section, but also when the main pump 202 is not subject to the limitation by the second torque control section, so that the rated output torque Terate of the prime mover can be effectively used.

5. The regulator 212 of the main pump 202, because including no load sensing control section, can be simply configured and allows the reducing valve 112$g$ to output a pressure that simulates the absorption torque of the main pump 202 without the need to incorporate a complicated mechanism. Thus, configuration of the regulator 112 for performing the total torque control can be simplified, reduction in size of the entire pump including the main pumps 102 and 202 and the regulators 112 and 212 can be achieved, and increase in cost can be prevented.

Second Embodiment

—Structure—

Figure 6:
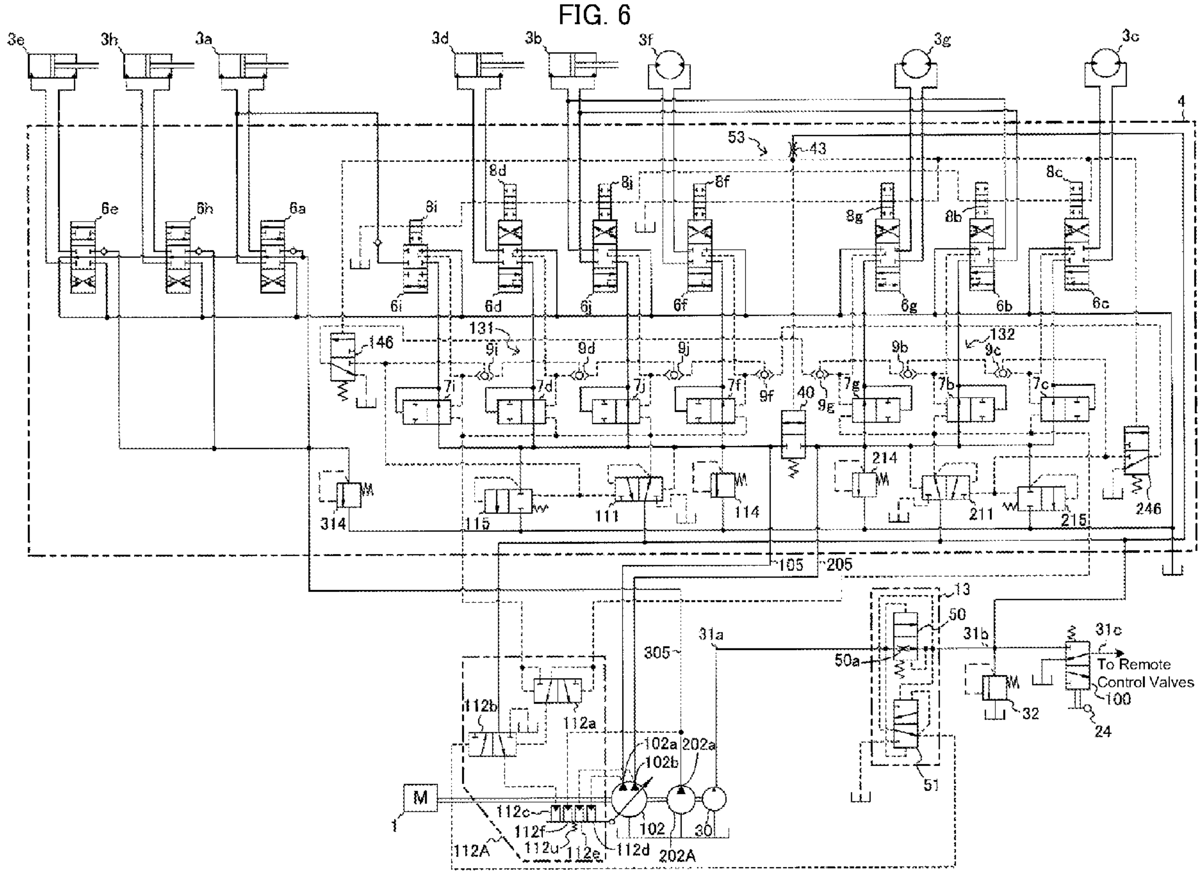
FIG. 6 is a diagram illustrating a hydraulic drive system for a hydraulic excavator (construction machine) according to a second embodiment of the present invention.

FIG. 6 is a diagram illustrating a hydraulic drive system for a hydraulic excavator (construction machine) according to a second embodiment of the present invention.

The second embodiment differs from the first embodiment shown in FIG. 1 in that the second embodiment includes a fixed displacement main pump 202A in place of the variable displacement main pump 202. This difference results in the main pump 202A not including a regulator 212 that is included in the main pump 202 and results in a regulator 112A of a main pump 101 not including a reducing valve 112$g$.

Operations of the present embodiment are basically the same as the operations of the first embodiment except for the differences relating to the main pump 202A of the fixed displacement type and the effects of 1 to 3 described above can be achieved as in the first embodiment.

The delivery pressure of the main pump 202A being introduced to a reducing torque control piston 112$f$ causes the main pump 102 reduces the absorption torque thereof by the absorption torque of the main pump 202A. Total torque control is thus performed such that the total of the absorption torque values of the main pump 102 and the main pump 202A does not exceed a predetermined value (maximum torque T12max).

Additionally, the main pump 202A is a fixed displacement type including no regulator. Further reduction in size and cost can thus be achieved of an entire pump including the main pumps 102 and 202A and the regulator 112A.

[Others]

It should be understood that the foregoing description of the embodiments is intended as illustrative only and various changes may be made without departing from the spirit and scope of the invention.

For example, while the above embodiments have been described to include the first pump device that is the split-flow-type hydraulic pump 102 having the first and second delivery ports 102$a$ and 102$b$, the first pump device may be a variable displacement hydraulic pump having a single delivery port.

The above embodiments have been described in the case in which the construction machine is a hydraulic excavator, the first specific actuator is the boom cylinder 3$a$, and the second specific actuator is the arm cylinder 3$b$. Nonetheless, the first and second specific actuators may be any cylinders other than the boom cylinder and the arm cylinder, if the second actuator is an actuator used at relatively high frequency in a combined operation with the first specific actuator.

Additionally, the present invention may be applied to another type of construction machine other than the hydraulic excavator, such as a hydraulic traveling crane, when the construction machine includes an actuator that satisfies the operating conditions of the first and second specific actuators.

Additionally, the load sensing system in the above-described embodiments is illustrative only and various changes may be made in the load sensing system. For example, the above-described embodiments each include a differential pressure reducing valve that outputs the pump delivery pressure and the maximum load pressure as an absolute pressure; and the output pressure is introduced to the pressure compensating valve to thereby set a target compensating differential pressure and is introduced to the LS control valve to thereby set the target differential pressure for the load sensing control. Nonetheless, the pump delivery pressure and the maximum load pressure may be introduced to the pressure control valve and the LS control valve through respective hydraulic lines.

DESCRIPTION OF REFERENCE CHARACTERS

1: Prime mover
102: Variable displacement main pump (first pump device)
102$a$, 102$b$: First and second delivery ports
112: Regulator (first pump control unit)
112$a$: Low pressure selection valve
112$b$: LS control valve
112$c$: LS control piston
112$d$, 112$e$: Torque control pistons
112$f$: Reducing torque control piston
112$g$: Reducing valve
112$t$: Spring
112$u$: Spring
202: Variable displacement main pump (second pump device)
202$a$: Third delivery port
212: Regulator (second pump control unit)
212$d$: Torque control piston
212$e$: Spring
115: Unloading valve
215: Unloading valve
111, 211: Differential pressure reducing valves
146, 246: Second and third selector valves
3$a$-3$h$: Actuators
3$a$, 3$b$, 3$c$, 3$d$, 3$f$, 3$g$: First actuators
3$a$, 3$e$, 3$h$: Second actuators
3$a$: Boom cylinder (first specific actuator)
3$b$: Arm cylinder (second specific actuator)
4: Control valve unit
6$a$, 6$e$, 6$h$: Open center type flow control valves
6$a$: Flow control valve for main drive for boom cylinder (first flow control valve)
6$b$-6$d$, 6$f$, 6$g$, 6$i$, 6$j$: Closed center type flow control valves

6*i*: Flow control valve for assist drive for boom cylinder (second flow control valve)
7*b*-7*d*, 7*f*, 7*g*, 7*i*, 7*j*: Pressure compensating valves
8*b*-8*d*, 8*f*, 8*g*, 8*i*, 8*j*: Operation detecting valves
9*d*, 9*f*, 9*i*, 9*j*: Shuttle valves
9*b*, 9*c*, 9*g*: Shuttle valves
13: Prime mover speed detecting valve
24: Gate lock lever
30: Pilot pump
31*a*, 31*b*, 31*c*: Pilot hydraulic fluid supply lines
32: Pilot relief valve
40: Third selector valve
53: Track combined operation detecting hydraulic line
100: Gate lock valve
122, 123, 124*a*, 124*b*: Operating units
131: First load pressure detecting circuit
132: Second load pressure detecting circuit
105: First hydraulic fluid supply line
205: Second hydraulic fluid supply line
305: Third hydraulic fluid supply line

The invention claimed is:

1. A hydraulic drive system for a construction machine, comprising:

a variable displacement first pump device;

a second pump device;

a plurality of first actuators that are driven by hydraulic fluids delivered from the first pump device;

a plurality of second actuators that are driven by hydraulic fluids delivered from the second pump device;

a plurality of closed center type flow control valves that control flows of hydraulic fluids supplied from the first pump device to the first actuators;

a plurality of open center type flow control valves that control flows of hydraulic fluids supplied from the second pump device to the second actuators;

a plurality of pressure compensating valves that control differential pressures across the respective closed center type flow control valves; and a first pump control unit including a load sensing control section that controls capacity of the first pump device such that a delivery pressure of the first pump device is higher by a target differential pressure than a maximum load pressure of the first hydraulic actuators, wherein the first and second actuators include at least one first specific actuator as a common actuator, the first actuators include a second specific actuator that is used at relatively high frequency in a combined operation with the first specific actuator, the open center type flow control valves include a first flow control valve that controls a flow of a hydraulic fluid supplied from the second pump device to the first specific actuator, the closed center type flow control valves include a second flow control valve that controls a flow of a hydraulic fluid supplied from the first pump device to the first specific actuator, and the first and second flow control valves are set to have an opening area characteristic such that, when an operating unit for the first specific actuator is operated up to an intermediate zone of an operating range, only the first flow control valve opens to supply a hydraulic fluid from the second pump device to the first specific actuator and, when the operating unit is operated further from the intermediate zone, both the first and second flow control valves open to join and supply hydraulic fluids from the first and second pump devices to the first specific actuator.

2. The hydraulic drive system for a construction machine according to claim 1, wherein the first flow control valve is set to have the opening area characteristic such that an opening area increases with increase in the spool stroke and reaches a maximum before a maximum spool stroke is reached, and the second flow control valve is set to have the opening area characteristic such that an opening area remains zero before a spool stroke reaches an intermediate stroke, opens at the intermediate stroke, and then increases with increase in the spool stroke and reaches a maximum opening area before a maximum spool stroke is reached.

3. The hydraulic drive system for a construction machine according to claim 1, further comprising:

a second pump control unit that controls capacity of the second pump device, wherein the first pump device includes the load sensing control section and a first torque control section that receives the delivery pressure of the first pump device introduced thereto and controls to limit the capacity of the first hydraulic pump such that, when at least one of the delivery pressure and the capacity of the first hydraulic pump increases and absorption torque of the first pump device increases, the absorption torque of the first hydraulic pump does not exceed a first predetermined value, the second pump control unit includes a second torque control section that receives a delivery pressure of the second pump device introduced thereto and controls to limit the capacity of the second hydraulic pump such that, when the delivery pressure of the second hydraulic pump increases and absorption torque of the second pump device increases, the capacity of the second pump device is maintained at a maximum when the absorption torque of the second hydraulic pump is equal to or smaller than a second predetermined value and the absorption torque of the second hydraulic pump does not exceed the second predetermined value when the absorption torque of the second hydraulic pump increases up to the second predetermined value, and the first pump control unit further includes: a reducing valve that receives the delivery pressure of the second pump device introduced thereto and, when the delivery pressure of the second pump device is equal to or lower than a capacity limiting control starting pressure of the second torque control section, outputs the delivery pressure of the second pump device without reduction and, when the delivery pressure of the second pump device increases beyond the capacity limiting control starting pressure of the second torque control section, reduces the delivery pressure of the second pump device to the capacity limiting control starting pressure of the second torque control section and outputs the reduced delivery pressure of the second pump device; and a reducing torque control actuator that receives the output pressure of the reducing valve and reduces the capacity of the first pump device such that the first predetermined value decreases as the output pressure of the reducing valve increases.

4. The hydraulic drive system for a construction machine according to claim 1, wherein the first specific actuator is a boom cylinder that drives a boom of a hydraulic excavator and the second specific actuator is an arm cylinder that drives an arm of the hydraulic excavator.

5. The hydraulic drive system for a construction machine according to claim 2, wherein the first specific actuator is a boom cylinder that drives a boom of a hydraulic excavator and the second specific actuator is an arm cylinder that drives an arm of the hydraulic excavator.

6. The hydraulic drive system for a construction machine according to claim 3, wherein the first specific actuator is a boom cylinder that drives a boom of a hydraulic excavator and the second specific actuator is an arm cylinder that drives an arm of the hydraulic excavator.

* * * * *